United States Patent
Uhrenholt et al.

(10) Patent No.: US 11,954,038 B2
(45) Date of Patent: Apr. 9, 2024

(54) EFFICIENT EVICT FOR CACHE BLOCK MEMORY

(71) Applicant: Arm Limited, Cambridge (GB)

(72) Inventors: Olof Henrik Uhrenholt, Cambridge (GB); Håkan Lars-Göran Persson, Cambridge (GB); Jakob Axel Fries, Cambridge (GB)

(73) Assignee: Arm Limited, Cambridge (GB)

( * ) Notice: Subject to any disclaimer, the term of this patent is extended or adjusted under 35 U.S.C. 154(b) by 287 days.

(21) Appl. No.: 17/305,991

(22) Filed: Jul. 19, 2021

(65) Prior Publication Data
US 2022/0027281 A1    Jan. 27, 2022

(30) Foreign Application Priority Data

Jul. 23, 2020  (GB) ..................................... 2011446

(51) Int. Cl.
*G06F 12/0888* (2016.01)
*G06T 1/20* (2006.01)
*G06T 1/60* (2006.01)
*G06T 9/00* (2006.01)

(52) U.S. Cl.
CPC .......... *G06F 12/0888* (2013.01); *G06T 1/20* (2013.01); *G06T 1/60* (2013.01); *G06T 9/00* (2013.01); *G06F 2212/1044* (2013.01)

(58) Field of Classification Search
CPC ............. G06F 12/0207; G06F 12/0811; G06F 12/0888; G06F 12/12; G06F 2212/1044; G06F 2212/401; G06F 2212/455; G06T 1/20; G06T 1/60; G06T 9/00
See application file for complete search history.

(56) References Cited

U.S. PATENT DOCUMENTS 5,761,536 A * 6/1998 Franaszek ............ G06F 12/023 713/1
2004/0263519 A1 * 12/2004 Andrews ............ G06F 15/7846 345/557
2013/0268569 A1   10/2013 Akenine-Moller

FOREIGN PATENT DOCUMENTS

WO    2009/080448    7/2009

OTHER PUBLICATIONS

Combined Search and Examination Report dated May 11, 2021, GB Patent Application No. GB2011446.8.
Tian, et al., "Adaptive GPU Cache Bypassing," Proceedings of the 8th Workshop on General Purpose Processing using GPUs, Feb. 2015, https://doi.org/10.1145/2716282.2716283.

* cited by examiner

*Primary Examiner* — Larry T Mackall
(74) *Attorney, Agent, or Firm* — Vierra Magen Marcus LLP

(57) ABSTRACT

A data processing system includes a memory system, a processor and a cache system. The cache system includes a cache and a data encoder associated with the cache. The data encoder encodes blocks of uncompressed data having a particular data size for storing in the memory system. The processor is configured, when an array of data has a data size equal to the particular data size or is able to be combined with one or more other arrays of data already written to the cache to provide a plurality of arrays of data having a data size that is equal to the particular data size, to output the array of data from the processor to the data encoder, bypassing the cache, for encoding as or as part of a block of data having the particular data size.

7 Claims, 12 Drawing Sheets

EFFICIENT EVICT FOR CACHE BLOCK MEMORY

CROSS-REFERENCE TO RELATED APPLICATIONS

This application claims priority pursuant to 35 U.S.C. 119(a) to United Kingdom Patent Application No. 2011446.8, filed Jul. 23, 2020, which application is incorporated herein by reference in its entirety.

BACKGROUND

The technology described herein relates to data processing systems and in particular to systems for and methods of writing out arrays of data generated by data processing systems, such as graphics processing systems.

Graphics processing operations, which may be performed by a graphics processor (graphics processing unit (GPU)), typically process data in an uncompressed form. When such operations have produced a particular output (e.g. frame), the output data may then be written to a (e.g. frame) buffer, for example in main memory, for storage before further processing (e.g., display of the frame).

To reduce the amount of data that needs to be transferred to and from memory, and the associated power cost of moving such data back and forth, during a graphics processing operation, the data may be compressed before being written to memory. This allows the data to be stored in a compressed format. When the data is required for further processing, the compressed data is then read from memory and decompressed, such that it is then in a suitable format for the graphics processing operations.

To assist with storing data locally to a graphics processing unit while the graphics processing operations using this data are being performed, a cache may be used. This helps to reduce the need to fetch data from slower data stores, such as main memory of the graphics processing system. However, such caches have a finite (limited) amount of storage space.

The Applicants believe that there remains scope for improvements to compression and cache operations in graphics processing systems.

BRIEF DESCRIPTION OF THE DRAWINGS

A number of embodiments of the technology described herein will now be described by way of example only and with reference to the accompanying drawings, in which.

DETAILED DESCRIPTION

Figure 1:
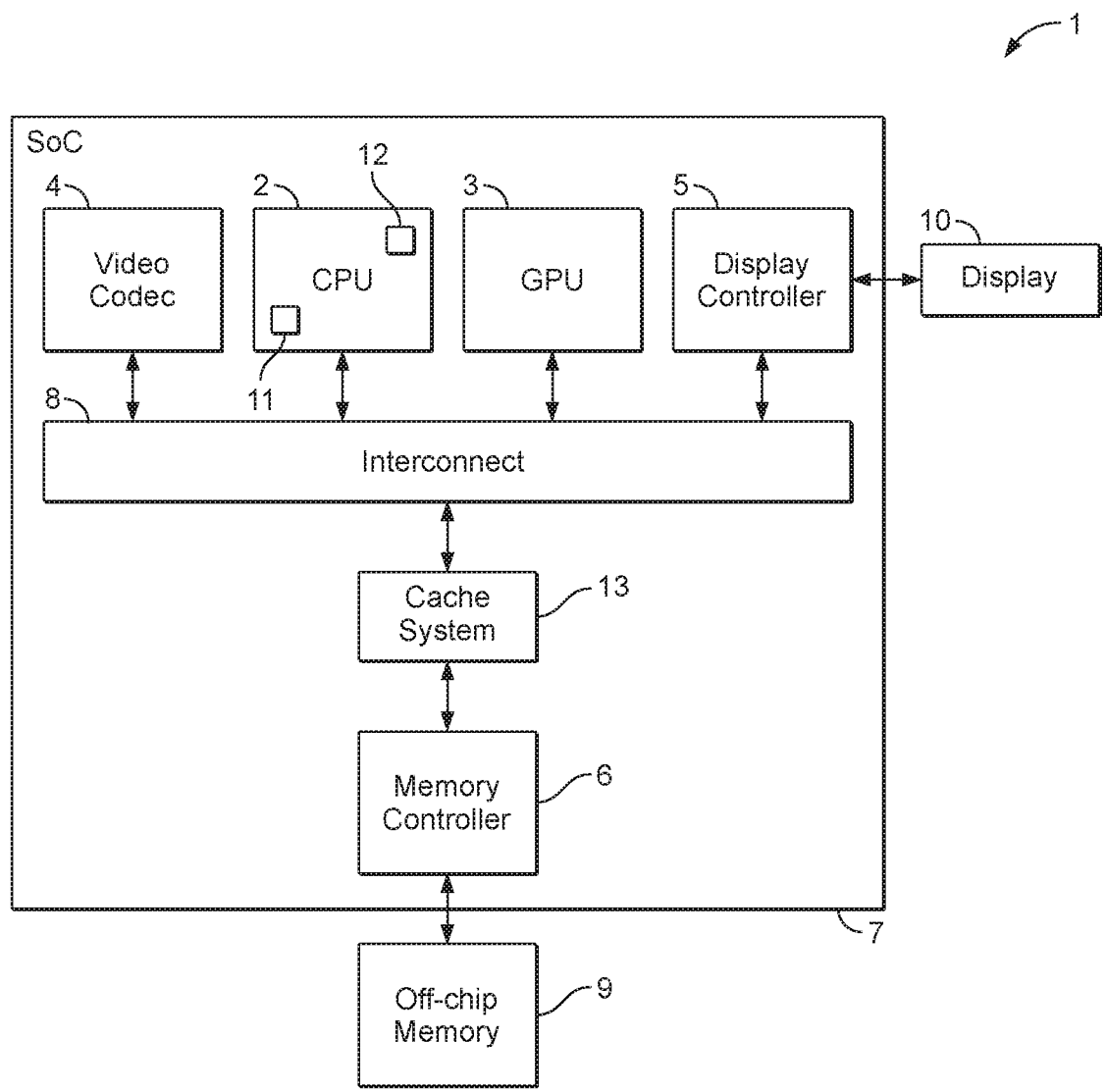
FIG. 1 shows an exemplary graphics processing system in which the technology described herein may be implemented.

An embodiment of the technology described herein comprises a graphics processing system comprising:
  a memory system;
  a graphics processor; and
  a cache system comprising:
    a cache configured to store data for use by the graphics processor when performing graphics processing operations; and
    a data encoder associated with the cache and configured to:
      encode a block of uncompressed data having a particular data size for storing in the memory system in a compressed format;
  wherein the graphics processor is configured to, for an array of data to be output from the graphics processor to the memory system:
    when the array of data or a portion of the array of data has a data size that is equal to the particular data size, or the array of data is able to be combined with one or more other arrays of data already written to the cache to provide a plurality of arrays of data that together have a data size that is equal to the particular data size:
      provide a portion of the array of data that is equal to the particular data size or the array of data from the graphics processor to the data encoder, bypassing the cache, for encoding as or as part of a block of data having the particular data size.

Another embodiment of the technology described herein comprises a method of operating a graphics processing system, the graphics processing system comprising:
  a memory system;
  a graphics processor; and
  a cache system comprising a cache configured to store data for use by the graphics processor when performing graphics processing operations, and a data encoder associated with the cache and configured to encode a block of uncompressed data having a particular data size for storing in the memory system in a compressed format;
  the method comprising:
    for an array of data to be output from the graphics processor to the memory system, when the array of data or a portion of the array of data has a data size that is equal to the particular data size, or the array of data is able to be combined with one or more other arrays of data already written to the cache to provide a plurality of arrays of data that together have a data size that is equal to the particular data size:
      the graphics processor providing a portion of the array of data that is equal to the particular data size or the array of data from the graphics processor to the data encoder, bypassing the cache, for encoding as or as part of a block of data having the particular data size.

Thus the technology described herein comprises a graphics processing system and a method of operating a graphics processing system. The graphics processing system includes a (e.g. main) memory system, a graphics processor (e.g. GPU) and a cache system.

The memory system stores data that may be required by the graphics processor. The graphics processor may be arranged to perform graphics processing operations (using the data, e.g. in an uncompressed format), such as generating a render output (e.g. a frame, e.g. for display). The graphics processor is arranged to operate on (e.g. generate) arrays of data (e.g. of a frame of data).

The cache system includes a cache arranged to store data (e.g. received from the memory system) for use by the graphics processor. The cache system also includes a data encoder associated with the cache. The data encoder is arranged to encode (compress) uncompressed data, when this data is to be output to the memory system, and, e.g., to send the compressed data to the memory system for storing. The uncompressed data to be encoded and output to the memory system may be from the graphics processor and/or the cache.

The data encoder is arranged to encode blocks of uncompressed data, e.g. using a block-based encoding technique. These "compression blocks" of data (e.g. each) have a particular data size (in their uncompressed form), e.g. owing to the nature of the encoding technique and/or the manner in which the data is stored in the memory system. The encoded (compressed) data may then be stored in the memory system, in the compressed format.

The graphics processor is arranged to process arrays of data. When an array of data has been processed (e.g. written to a buffer of the graphics processor), the graphics processor needs to output this array, so that it may work on the next array.

When an array (e.g. tile) of data (that has been operated on (e.g. generated) by the graphics processor) is to be output (e.g. written) from the graphics processor to the memory system, and the data size of the array is greater than or equal to the particular data size (such that the array or a portion of the array has a data size that is equal to the particular data size of an (individual) block of data that is compressed by the data encoder), the graphics processor provides the array or a portion (i.e. some or all) of the array of data, having the particular compression block data size, directly to the data encoder, bypassing the cache. The array of data or portion of the array of data (having the particular data size) may then be encoded by the encoder (as a "compression block").

Similarly, when an array of data to be output is able to be combined with one or more other arrays of data, that have already been written to (and are thus stored in) the cache by the graphics processor, to provide (a plurality of arrays having) a combined total data size that is equal to the particular data size (i.e. the plurality of arrays together, as a block of data, has a data size that is equal to the particular data size), the graphics processor provides the array of data directly to the data encoder, bypassing the cache. This array of data may then be combined with one or more other arrays of data from the cache (which together have the particular data size) and encoded by the encoder (as a "compression block").

Thus, in these situations, the graphics processor is able to provide a portion or the whole of the array of data being output as the whole or part of the block of data (having the particular size) directly to the encoder for encoding.

The technology described herein therefore comprises a more streamlined process for outputting an array of data from a graphics processor to memory. By, e.g., identifying, from the size of an array of data being output by the graphics processor, when at least some of the array of data is able to be sent straight to the data encoder, either as a full compression block or such that it can be combined (e.g. by the data encoder) with other data from the cache to provide a full compression block, the process of outputting data for encoding (and sending to memory) can be simplified. It will be appreciated that this process is faster and more efficient.

This is because for the (e.g. portion of the) array of data sent straight to the encoder, the data does not first need to be written to the cache and then evicted to the encoder (as is the case, for example, for other data arrays that may be combined to provide a compression block). This saves both time and power.

(It will be appreciated that arrays of data of a plurality of arrays of data, that are to be combined into a compression block, may not necessarily be output by the graphics processor as sequential arrays. Instead, such arrays may be output spaced by a number of processing cycles of the graphics processor. The cache is a convenient location for storing these arrays temporarily (instead of sending them all directly to the data encoder) until all of the plurality of arrays have been processed and are ready to be encoded as a compression block.)

It also means that lines in the cache, which will generally have a limited storage capacity, do not have to be allocated for the data that is output straight to the encoder. This prevents existing data stored in the cache, which may be required in the near future by the graphics processor, from being evicted to make room for the data being output by the graphics processor.

The ability of the graphics processor to output an (e.g. portion of an) array of data directly to the encoder, either as a full or a partial compression block, helps to give the flexibility to handle arrays being processed by the graphics processor having multiple different data sizes, particularly when being used with a compression scheme of the data encoder and memory that uses a compression block having a, e.g. fixed, particular data size.

The graphics processing system of the technology described herein includes a memory system, a graphics processor and a cache system.

The memory (memory system) of the graphics processing system that the cache system of the technology described herein interfaces with may comprise any suitable and desired memory and memory system of the graphics processing system (e.g. of an overall data processing system that the graphics processing system is part of), such as, and in an embodiment, a main memory for the graphics processing system (e.g. where there is a separate memory system for the graphics processor), or a main memory of the data processing system that is shared with other elements, such as a host processor (CPU), of the data processing system.

The graphics processor of the graphics processing system can comprise any suitable and desired graphics processor that is operable to perform graphics processing operations on an array of data. The graphics processor should, and in an embodiment does, comprise one or more (and in an embodiment a plurality of) processing (shader) cores, which are (e.g. each) operable to perform graphics processing operations on (an array of) data to be processed by the graphics processor.

The array of data that is to be output to the memory system from the graphics processor may comprise any suitable and desired data array that a graphics processor may generate. The array of data in an embodiment comprises an array of data elements each having an associated data value(s). In an embodiment the graphics processor is configured to generate the array data in an uncompressed format, i.e. the array of data comprises an uncompressed array of data.

The array of data may comprise, for example, and in an embodiment, an image (or portion thereof) that the graphics processor is generating, and thus the data will comprise appropriate colour values for the data elements (sampling positions) of the data array and that the data array represents. In this case, the data array may comprise, for example, a tile or frame (a tile or frame buffer), e.g. of image data, that the graphics processor is generating, e.g. for display, and/or data, such as a graphics texture, that is being generated by the graphics processor.

In other arrangements, the data may comprise geometry data, such as for or of vertices and/or primitives that the graphics processor is processing. Thus, in an embodiment, the array of data that is operated on by the graphics processor and handled in the manner of the technology described herein comprises image data (e.g. a texture, tile or frame) or geometry data (positions and/or attributes).

The array of data that is to be output from the graphics processor to the memory system may comprise the whole of the output, e.g. frame that the graphics processor is currently generating (i.e. such that only a single array of data will be output for the whole of the output frame).

However, in one embodiment the array is a portion (less than the whole) of a frame of (e.g. image) data. Thus, the overall frame of data will be generated and output to the memory system as a plurality of arrays of data, e.g. representing a respective plurality of areas of the frame.

Thus, in an embodiment, the operation in the manner of the technology described herein is performed for (e.g. each of) a plurality of arrays (e.g. making up some or all of an overall frame of data). As discussed below, there are a number of ways in which this may be implemented.

Where the graphics processor operates to produce plural arrays of data making up an overall output frame, each array of data that the frame is divided into for the purposes of processing by the graphics processor may represent any suitable and desired region (area, e.g. tile) of the overall frame. In an embodiment, each array of data represents a different region of the overall frame of data (although the arrays could overlap when desired). Each array should represent an appropriate region (area) of the frame of data, such as a plurality of data positions within the frame (e.g. pixels of image data).

Thus, in an embodiment, each array comprises a tile of pixels of a frame of image data.

The array(s) of data to be stored to memory from the graphics processor may have any suitable and desired size and shape. They are in an embodiment rectangular in shape, e.g. square. In an embodiment the array(s) each have a size between and including 2×2 data elements (sampling positions, e.g. pixels) and 64×64 data elements, e.g. with each edge of the rectangular array(s) having a size of $2^n$ data elements, where n is an integer (e.g. between and including 1 and 6). The integer n may be different for the two edges of a (e.g. each) rectangular array.

In an embodiment the rectangular array(s) each have 64 data elements (sampling positions, e.g. pixels). Thus the rectangular array(s) each may have a size (e.g. corresponding to a rendering tile) of 32×2, 16×4 or 8×8 data elements (e.g. oriented in either landscape or portrait). Other sizes of arrays (e.g. larger, smaller or different aspect ratios) would, of course, be possible.

Each data element of a data array may comprise any suitable and desired piece or pieces of data. In one embodiment each data element of an array comprises 4 bytes (32 bits) of data. Thus, for example, when a (e.g. each) rectangular array has 64 data elements, the rectangular array has a total data size of 256 bytes. Other data sizes for the data elements and arrays would, of course, be possible.

In one set of embodiments the graphics processor comprises (local) storage, e.g. a (tile) buffer, configured to store data (of the array to be output to memory) that has been processed, e.g. while other data (of the array to be output to memory) is being processed, before data of (at least a portion of) the array is provided (e.g. written) to the data encoder or the cache (as appropriate). Thus the data of the array to be output to memory may be accumulated in the (tile) buffer before the array is provided (e.g. written out) to the data encoder or the cache. In an embodiment the graphics processor is arranged to write arrays (e.g. tiles of) data (e.g. of a frame) that it is processing to the (tile) buffer, for outputting to the memory (via the data encoder and, e.g., cache as appropriate).

The (tile) buffer may have any suitable and desired size. In one embodiment the (tile) buffer is able to store any (and all) sizes of arrays of data that the graphics processor may process to then be output to memory. Thus the buffer is in an embodiment able to store a (e.g. the largest) tile of data being (e.g. able to be) processed by the processed by the graphic processor.

For example, the buffer may be able to store an array of data having a size up to 64×64 data elements, each comprising 4 bytes of data (giving a total size of 16,384 bytes). This allows the buffer to store any suitable and desired size of array (and, e.g., plural arrays) that the graphics processor may process, up to and including the size of the buffer.

When the graphics processor comprises one or more (e.g. a plurality of) processing (shader) cores, each (shader) core may comprise (local) storage, e.g. a (tile) buffer, configured to store data (of an array to be output to memory) that has been processed by that (shader) core. In an embodiment each (shader) core of the graphics processor is arranged to write arrays (e.g. tiles of) data that it is processing to its respective (tile) buffer, for outputting to the memory (via the data encoder and, e.g., cache as appropriate).

For an array (e.g. tile) that has been processed and is ready to be output to the memory system, the cache is bypassed when at least a portion (some or all) of the array has the particular data size. The encoder is then able to encode the array or the portion of the array as a "compression block". In this case, the array or portion of the array is sent directly to the encoder, bypassing the cache. There are a number of circumstances in which this may happen, in an embodiment depending on the size of the array that has been processed by the graphics processor and is ready for being output to memory.

For example, when the array to be output has a data size that is equal to the particular data size, the whole of the array is provided directly to the data encoder, bypassing the cache. In another example, when the array to be output has a data size that is greater than the particular data size, a portion (i.e. less than the whole) of the array (the portion having a data size equal to the particular data size) is provided directly to the data encoder, bypassing the cache.

On the other hand, in the case where the array to be output has a data size that is less than the particular data size, but the array is able to be combined with one or more arrays of data already stored in the cache to provide plural arrays together having the particular data size, the array is again provided directly to the data encoder, bypassing the cache.

Otherwise, in the case of an array to be output that has a data size less than the particular data size, the array is in an embodiment written to the cache (e.g. to be combined with one or more arrays subsequently processed and to be output).

When the graphics processor comprises plural processing (shader) cores, each processing core may operate with the cache system and cache in the manner of the technology described herein.

The cache will receive and store data from the graphics processor, e.g. when array(s) of data having a data size that is less than the particular data size are to be stored in the cache for combining into a compression block before being transferred to the data encoder (or otherwise for data that may be generated by the graphics processor that is not necessarily to be handled in the manner of the technology described herein). The cache is correspondingly in an embodiment arranged to receive and store data from the memory system, so to be available to (e.g. when requested by) the graphics processor.

The data is in an embodiment stored in the cache in an uncompressed (decoded) format.

The cache system that is arranged between the memory system and the graphics processor can be any suitable and desired cache system that is operable to and configured to hold data between the graphics processor (the processing core or cores of the graphics processor) and the memory system.

The cache system may comprise a single cache "level", in which case it will be that cache level that is associated with the data encoder (and that stores data, e.g. in an uncompressed form, for use by the graphics processor when performing graphics processing operations).

In embodiments, the cache system comprises multiple cache levels (a cache hierarchy), such as L2 and L3 caches. In this case, the cache that is associated with the data encoder is one level of the cache system (with other levels of the cache system then not having a data encoder associated with them). In this case, the cache that is associated with the data encoder is the cache level that is closer to the graphics processor (the processing core(s) of the graphics processor). In an embodiment the cache level of the cache hierarchy that is associated with the data encoder (and from which data is provided to and received from the (e.g. processing core(s) of the) graphics processor) is the L2 cache.

The cache (that is associated with the data encoder) and into which data is written by the graphics processor and read from by (or provided, e.g. evicted, to) the data encoder, e.g. when array(s) of data are to be stored in the cache before being transferred to the data encoder for combining into a compression block, can (subject to the particular operation of the technology described herein) be configured and operate in any suitable and desired manner, e.g. in accordance with the normal cache arrangements of the graphics processor and graphics processing system in question.

In an embodiment, the cache comprises a plurality of cache lines, each able to store a respective data entry or entries. Each cache line may be able to store any suitable and desired amount of data, such as 64 bytes of data, and may relate to the size of a compression block in any suitable and desired way.

In one embodiment, the particular data size of the compression block (when uncompressed) corresponds to an integer number of (one or more, e.g. full) cache lines of the cache. In another embodiment, the cache lines of the cache are each able to store an integer number of compression blocks (when uncompressed).

Correspondingly, the array or portion of the array being output, may relate to the size of each cache line in any suitable and desired way. Thus, in one embodiment an array or a portion of an array being output from the graphics processor corresponds to an integer number of (one or more, e.g. full) cache lines of the cache. In another embodiment, the cache lines of the cache are each able to store an integer number of arrays (or portions thereof). However, it will be appreciated that, in accordance with some embodiments of the technology described herein, the array or portion of the array being output may not be written to the cache, instead being output directly to the encoder.

The graphics processing system may comprise a single physical cache, or the cache may be divided into plural separate physical portions ("slices"), with each slice, e.g., storing respective data, e.g. for a respective processing core of the graphics processor. When the cache comprises plural separate physical portions associated with respective processing cores of the graphics processor, in an embodiment the portion of the cache associated with a particular processing core is bypassed (for arrays having sizes greater than or equal to the particular data size) when an array from that processing core is output.

The cache system (comprising the cache and the associated data encoder) may interface with the (e.g. processing core(s) of the) graphics processor so as to be able to transfer data therebetween in any suitable and desired manner. In an embodiment, the graphics processing system comprises an appropriate interconnect, such as an asynchronous switch network (ASN), that interfaces between the cache system (e.g. the L2 cache and/or the data encoder) and the (e.g. processing core(s) of the) graphics processor. The interconnect may also interface between the (e.g. L2) cache and the data encoder.

In one embodiment the interconnect comprises an arbiter configured to direct an array, or a portion of an array, of data, being output to the data encoder or, e.g. to the cache, respectively, as appropriate. Thus in an embodiment the arbiter is configured to:

determine when the (e.g. at least the portion of the) array of data is to be output to the data encoder or, e.g. to the cache; and when the (e.g. at least the portion of the) array of data has been determined to be output to the data encoder, direct the (e.g. at least the portion of the) array of data to the data encoder, and when the (e.g. at least the portion of the) array of data has been determined to be output to the cache, direct the (e.g. at least the portion of the) array of data to the cache.

The arbiter may be arranged to determine when an array, or a portion of an array, of data is to be directed towards the data encoder or, e.g. the cache, in any suitable and desired way. The arbiter may be arranged to determine when the (e.g. at least the portion of the) array of data has a data size that is equal to the particular data, or the (e.g. at least the portion of the) array of data is able to be combined with one or more arrays of data already in the cache, or the array of data will be able to be combined with one or more arrays of data yet to (all) be output.

However, in one embodiment the arbiter is configured to determine when an array, or a portion of an array, of data is to be directed towards the cache or the data encoder using a signal (e.g. comprising side band information) from the (e.g. processing core of the) graphics processor outputting the (e.g. at least the portion of the) array of data. As will be discussed below, in an embodiment the (e.g. processing core of the) graphics processor is configured to issue a (e.g. side band) signal (e.g. accompanying the array of data) indicating the destination to which the array of data is to be output (e.g. written).

Thus, in an embodiment the graphics processor is configured to (and the method comprises the graphics processor) determine when an array or data or a portion of the array of data (to be output from the graphics processor to the memory system) has a data size that is equal to the particular data size, or when an array of data is able to be combined with one or more other arrays of data already written to the cache to provide a plurality of arrays of data that together have a data size that is equal to the particular data size, and to provide a corresponding indication, e.g. side band signal, of that.

In an embodiment, the graphics processor comprises a write out unit configured to output (e.g. control the output of) the arrays of data from the graphics processor. In an embodiment the write out unit is associated with (and, e.g., controls the output of data from) the buffer of the graphics processor.

Thus, in an embodiment the write out unit is configured to determine when (e.g. at least a portion of) an array to be output from the graphics processor is to be output to the data encoder or written to the cache, e.g. using the criteria of the predetermined data size or when a plurality of arrays may be combined, as outlined herein. For example, the write out unit may receive instructions (e.g. from an application that is using, or a driver for, the graphics processor) indicating the data size of an array (or a plurality of arrays) to be processed or output. The write out unit may use this information to determine whether to output (e.g. at least a portion of) an array to the data encoder or the cache, for example.

The write out unit will correspondingly be configured to output an (e.g. at least a portion of an) array to the data encoder when it is determined that the (e.g. at least a portion of the) array is to be output to the data encoder, and to write an array to the cache when it is determined that the array is to be output to the cache.

In an embodiment the write out unit is configured to issue a (e.g. side band) signal (e.g. accompanying the (e.g. at least a portion of the) array of data being output) indicating the destination to which the array of data is to be output (e.g. written). The signal may also be issued to request that other array(s) of data that are already stored in the cache be output (e.g. evicted) from the cache to the data encoder (this will be discussed further below).

The data encoder is arranged to encode (compress) uncompressed data when this data is to be output to the memory system, and, e.g., to send the compressed data to the memory system for storing. In the manner of the technology described herein, the data encoder is operable to encode (compress) uncompressed data (i.e. an array or portion of an array received directly) from the graphics processor, together with, when necessary, data (e.g. other arrays) from the cache, when data is to be output from the graphics processor to the memory system.

The data encoder is configured to encode uncompressed data in "compression" blocks of a particular data size. The compression block may thus be formed from a single (e.g. portion of an) array of data having the particular data size or from a plurality of arrays of data that together have the particular data size and which are combined to provide the compression block.

Subject to the particular operation of the technology described herein, the data encoder can otherwise operate in any suitable and desired manner, such as, and in an embodiment, in accordance with the normal manner for data encoding operations in the graphics processing system in question.

Thus, for example, in an embodiment the data encoder is also arranged to decode (decompress) compressed data from the memory system, when this data is to be read (retrieved) from the memory system, for use in an uncompressed format (e.g. for storing in the cache and/or for use by the graphics processor). Therefore, in an embodiment the data encoder is arranged to read in and, e.g. store in the cache, data from the memory system in an uncompressed form, and return data to the memory system in a compressed form.

In these embodiments, in which the data encoder is arranged to decode (decompress) compressed data from the memory system, in an embodiment this data is written into the cache, for storing in the cache in an uncompressed format. The data may then be available in the cache for use by the graphics processor in graphics processing operations.

The data encoder that is associated with the cache and that is operable to, inter alia, compress data from the graphics processor (and, when necessary, the cache) for writing to the memory system, can be any suitable and desired data encoder that can operate in this manner.

In general, the data encoder should be, and is in an embodiment, operable to read data from the (e.g. (tile) buffer(s) of the) graphics processor (and, when necessary, the cache) and process it (e.g. compress it) before that data is then stored in the memory system (and, in the case of a multi-level cache system, in an embodiment in another level of the cache system that is closer to the memory system than the cache level that is associated with the data encoder).

The data encoder should, and in an embodiment does, comprise an appropriate codec (data coder/decoder) operable to and configured to encode (compress) data to be output from the graphics processor (and, when necessary, the cache) to the memory system and, e.g., to decode (decompress) data to be read from the memory system (e.g. into the cache).

The data encoder may comprise a plurality of codecs. The plurality of codecs may be configured to encode and decode the data using a plurality of (e.g. different) encoding and decoding techniques respectively.

In one set of embodiments the data encoder comprises (local) storage, e.g. a buffer, configured to store the data that is to be encoded or decoded, e.g. while the data is being encoded or decoded and/or before the data is written to the cache, the graphics processor or (towards) the memory system, as appropriate. Thus, the data will be temporarily buffered in the data encoder while it is being encoded/decoded, before it is output, etc.

The data encoder (the codec(s) of the data encoder) may use any suitable and desired encoding and, e.g., decoding technique(s). Thus the data encoder may be configured to perform any suitable and desired encoding (e.g. compression) and, e.g., decoding (e.g. decompression) operation(s), e.g. in dependence on the compression format(s) that may be used for the data.

The data encoder is configured to encode a block of uncompressed data (as a "compression block") and thus in an embodiment the data encoder is configured to encode and, e.g., decode data using a block-based encoding (compression) technique.

In this case, the data will be encoded (compressed) using a block-based compression scheme, and thus stored as respective (compressed) blocks of data in the memory system.

Thus, in an embodiment, the method comprises (and the data encoder is configured to) encoding (and, e.g., compressing) the block of data (comprising the portion of the array of data, the array of data or the arrays of data, as appropriate) and outputting (e.g. sending, writing) the encoded (compressed) block of data to memory.

The block(s) of data may be encoded (compressed) using any suitable and desired encoding (compression) technique. In one set of embodiments the method comprises (and the data encoder is configured to) encoding the block(s) of data using the frame buffer compression techniques described in the Applicant's patents U.S. Pat. Nos. 8,542,939 B2, 9,014,496 B2, 8,990,518 B2 and 9,116,790 B2. In one set of embodiments the method comprises (and the data encoder is configured to) also or instead encoding the block(s) of data using a fixed rate compression technique.

When multiple ("compression") blocks of data (e.g. of a frame or frames of data) (each corresponding to a portion of the array of data, the array of data or the arrays of data for each block of data) are compressed by the data encoder, respective blocks of data, will be encoded (compressed) separately, with those blocks then being stored in a compressed form as respective blocks. Similarly, when multiple blocks of compressed data are to be decompressed, they will be decoded separately by the data encoder.

The (and in an embodiment each) block of data to be encoded (compressed) by the data encoder has a particular data size. Thus, in operation of at least some embodiments of the technology described herein, the data encoder encodes blocks of data having the same size, e.g. each time the data encoder encodes a block of data.

The particular data size may be any suitable and desired data size for which the data encoder is arranged to encode blocks of data. In an embodiment the particular data size at which the data encoder is arranged to encode blocks is set (e.g. predetermined) for a particular instance of the graphics processor being used. For example, the particular data size may be set by an application that is using, or by a driver for, the graphics processing system.

In one embodiment the data encoder is arranged to encode a 256 or 512 byte uncompressed block of data, i.e. the particular data size may be 256 or 512 bytes. Other particular data sizes for the compression block, of the technology described herein, are of course possible.

It will be seen that the particular data size for the compression block (when uncompressed) to be encoded by the data encoder may, in some embodiments, correspond to an integer number of cache lines of the cache that is associated with the data encoder, e.g. 4 or 8 cache lines. (Thus, in the case of 64 byte cache lines, each data block in its uncompressed form may, e.g., comprise and be stored as a 256 or 512 byte block of data.)

The data encoder can be included in the cache system and associated with the cache (e.g. the cache level) in question in any suitable and desired manner.

As discussed above, when the cache system comprises multiple cache levels, the data encoder may be associated with any suitable and desired (single) level of the cache system and in one set of embodiments the data encoder is associated with the L2 cache.

In one set of embodiments the data encoder is integrated (e.g. directly) with the cache (the cache level) itself, e.g. the cache itself comprises the data encoder. Thus the, e.g. L2, cache may comprise the data encoder.

Where the cache (cache level) is provided as plural respective "physical" caches (as a set of plural cache "slices") then in one set of embodiments each respective cache "portion" (slice) is associated with a (and has its own) respective data encoder for that cache portion (slice). For example, the (e.g. L2) cache may comprise a plurality of portions (slices), e.g. each configured to receive data from the memory system and to provide data to the graphics processor for use when performing graphics processing operations and to receive data from the graphics processor for sending to the memory system, with each of the plurality of portions (e.g. slices) of the (e.g. L2) cache comprising a respective (its own) data encoder.

Thus, in one set of embodiments, the cache system comprises a plurality of data encoders associated with a respective plurality of portions (e.g. slices) of the (e.g. L2) cache. When the cache system comprises a plurality of data encoders associated with a respective plurality of portions of the cache, in an embodiment, when an array of data from the graphics processor (e.g. from a processing core associated with a particular cache portion, and thus data encoder), the portion of the cache associated with the particular processing core is bypassed (for arrays having sizes greater than or equal to the particular data size) and the (at least portion of the) array is output directly to the respective data encoder.

In one set of embodiments, when the graphics processing system comprises an interconnect (e.g. to control the data being transferred in and out of the cache), the data encoder is associated (e.g. integrated) with the interconnect (e.g. instead of incorporating the data encoder into the cache itself). Thus the interconnect may comprise the data encoder. In this case there may be a single data encoder integrated with the interconnect that is shared by all the cache "slices".

When an array of data is to be output from the graphics processor to the memory system, having been processed by the graphics processor and, e.g., having been fully written into a buffer of the graphics processor, the data of the array is output to the data encoder (directly or via the cache, as appropriate) for encoding before sending to the memory. In the technology described herein, it will be appreciated that depending on the size of the array to be output from the graphics processor, (e.g. a portion of) the array is output, either directly to the data encoder or to the cache, as appropriate.

In order to determine how to output an array of data (directly to the data encoder or to the cache, and whether to output the whole or a portion of an array at a time), it will be appreciated that the data size of the array should be known or determined. The data size of an array to be output may be determined in any suitable and desired way.

In an embodiment the data size of one or more, e.g. of a sequence of, arrays being processed by the graphics processor is set, e.g. by an application that is using, or by a driver for, the graphics processing system. Thus the graphics processor may be arranged to receive one or more instructions (e.g. from the application or driver) that set the data size of one or more of a sequence of arrays.

From these instruction(s), the graphics processor may thus be told, or is able to determine, the data size of an array to be (processed and) output by the graphics processor. This, with the knowledge of the particular data size, helps to enable the graphics processor to determine when an (e.g. portion of an) array of data is able to be output to the data encoder for encoding as a compression block or a plurality of arrays of data are able to be combined for encoding as a compression block.

The data size of the arrays being processed by the graphics processor may be set in any suitable and desired way, e.g. implicitly or explicitly. For example, one or in an embodiment both of the amount of data per data element and the dimensions (e.g. height, width, number of data elements), may be set for one or more, e.g. of a sequence of, arrays being processed by the graphics processor. From this, the (e.g. write out unit of the) graphics processor knows, or is able to determine, the data size of an array to be output.

Many different image formats may be used in the technology described herein, such as the data sizes for the data elements of the arrays (e.g. tiles) as outlined above. In one embodiment the image format of the array(s) being processed by the graphics processor has 32 bits (4 bytes) per data element (pixel), e.g. the RGBA8888 image format. For an array (tile) having 64 data elements (e.g. 8×8, 16×4, 32×2), this gives a data size of 256 bytes for the array. For an array having 16 data elements (e.g. 4×4, 8×2), this gives a data size of 64 bytes for the array.

Other image formats are, of course, possible. For example, a 16-bits per data element (pixel) image format would give a data size of 256 bytes for an array having 128 data elements. This could be a 16×8, 32×4 or 64×2 array, for example.

When the array (e.g. tile) to be output has (e.g. been determined to have) a data size equal to the particular data size, the (e.g. write out unit of the) graphics processor simply outputs the array of data to the data encoder, e.g. along with any appropriate (e.g. side band) signal(s). No data (of the array of data) needs to be (and in an embodiment is not) written to the cache and thus in an embodiment no cache lines are allocated for such data.

Such an array of data may, for example, comprise an appropriate (e.g. 8×8 sampling position) rendering tile. This size (8×8) for the array may thus have a data size of 256 bytes, when each sampling position has a data size of 4 bytes. Other sizes are, of course, possible. Thus, in some embodiments, the block of data encoded by the data encoder corresponds to a tile of data processed by the graphics processor.

When the array (e.g. tile) to be output has (e.g. been determined to have) a data size that is greater than the particular "compression block" data size, in an embodiment the array is output as plural separate portions of the array of data each having the particular data size, again directly to the data encoder, e.g. along with any appropriate (e.g. side band) signal(s). Again, no data (of the array) needs to be (and in an embodiment is not) written to the cache and thus in an embodiment no cache lines are allocated for such data.

In an embodiment the (e.g. write out unit of the) graphics processor is configured to, when an array of data to be output has a data size that is greater than the particular data size, for each of plural portions of data of the array of data, the plural portions of data each having a data size equal to the particular data size, output the portion of the array of data to the data encoder, bypassing the cache. In this way, plural portions of the array, each having the particular data size, are output to the data encoder, in order to output the array of data from the graphics processor. In an embodiment each of the plural portions of the array of data, having a data size equal to the particular data size, represents some but not all, and a (separate) region, of the array of data that is being output.

Thus, in some embodiments the block of data encoded by the data encoder comprises a portion of a tile of data generated by the graphics processor. In an embodiment such a (e.g. each) tile generated by the graphics processor comprises a plurality of portions of data to be written from the graphics processor (e.g. each having a data size equal to the particular data size). Thus, for example, when a tile has a size of 16×16 data elements, each having a data size of 4 bytes (giving a total data size for the tile of 1024 bytes), and the particular data size is 256 bytes, four 8×8 portions each having a data size of 256 bytes are written out, each to be encoded as the compression block. Other arrangement are of course possible.

When an array (e.g. tile) of data to be output has a data size that is less than the particular data size and is able to be combined with array(s) stored in the cache to provide a compression block, the array is output to the data encoder (directly or, in some embodiments, via the cache), e.g. along with any appropriate (e.g. side band) signal(s). Again, when the array is output directly to the data encoder no data (of the array) needs to be (and in an embodiment is not) written to the cache and thus in an embodiment no cache lines are allocated for such data.

In these embodiments the data encoder is arranged to encode a block of data comprising a plurality of arrays to be written from the graphics processor (some via the cache), the combined arrays having a data size equal to the particular data size. In this case, the particular data size is larger than the data size of an individual array, and is equal to the combined data size of a plurality of arrays.

A (e.g. each) block of data to be encoded may thus correspond to an appropriate plurality of arrays (e.g. tiles) of data (e.g. of a frame) that the graphics processor generates. The block of data to be encoded may be formed from plural differently sized arrays, or may be (and in an embodiment is) formed from plural arrays of the same size. The particular data size may thus be an integer multiple of the data size of an individual array (and thus of the array being written out from the graphics processor directly to the data encoder).

For these arrays that are smaller than the block of data to be encoded, each array of data to be combined into the compression block may comprise an appropriate (e.g. 4×4 sampling position) rendering tile (e.g. a virtual tile). This size (4×4) for the data array may thus have a data size of 64 bytes, when each sampling position has a data size of 4 bytes. Thus four of such arrays (e.g. tiles) may be combined to provide a 256 byte compression block. Other arrangement are of course possible.

In an embodiment such plural arrays (e.g. tiles) of data are contiguous arrays (regions) in a frame of data being generated. Conveniently (e.g. in an embodiment) these plural arrays are stored in contiguous regions of the memory (such that, for example, they have neighbouring memory addresses). When at least some of these plural arrays are written to the cache, for storage before being encoded in a group of arrays as the compression block, in an embodiment the arrays are stored in adjacent cache lines of the cache (e.g. owing to the graphics processor writing them out in sequence).

In an embodiment, for a plurality of arrays of data that are to be output from the graphics processor to the memory, that together have the particular data size and, e.g., are contiguous arrays in a frame of data being processed, the array(s) of the plurality of arrays are written to the cache, until all but one of the arrays are stored in the cache. Then, the final array of the plurality of arrays can be output directly to the data encoder (bypassing the cache), for providing the compression block with the other(s) of the plurality of arrays that are stored in the cache.

Thus, in an embodiment the (e.g. write out unit of the) graphics processor is configured to (and the method comprises), for an array of data to be output from the graphics processor to the memory system:

when the array of data has a data size that is less than the particular data size and the array is not able to be combined with one or more other arrays of data already written to the cache to provide a plurality of arrays of data having a data size that is equal to the particular data size (and, in an embodiment, the array is one of a plurality of arrays of data that together have the particular data size and, e.g., are contiguous arrays in a frame of data being processed)):

the (e.g. write out unit of the) graphics processor writing the array of data from the graphics processor to the cache (e.g. for storing for encoding in future as part of a block of data having the particular data size).

Thus, such an array will in an embodiment be able to be combined with one or more other arrays of data (that together provide a plurality of arrays of data having a data size that is equal to the particular data size), but they have not (all) been written to the cache yet. The array may be stored in the cache until all the arrays of the plurality of arrays (together having the particular data size and, e.g., being contiguous arrays in a frame of data being processed) have been generated and the final array of the plurality of arrays is to be output (directly to the data encoder, bypassing the cache).

The array(s) in the cache are in an embodiment then retrieved from the cache and sent to the data encoder, to be combined with the array of the plurality of arrays provided directly to the encoder to provide a compression block.

For array(s) to be written to the cache, in an embodiment the cache is configured to allocate one or more lines of the cache for each array to be written to the cache. As outlined above, in an embodiment the capacity of a cache line is equal to the data size of an array of data to be written to the cache (and so a single cache line may be allocated for each array of data to be written to the cache). When necessary, data already present in the one or more lines of data allocated for the array of data is evicted from these cache line(s).

In an embodiment the (e.g. write out unit of the) graphics processor is configured to (and the method comprises the (e.g. write out unit of the) graphics processor) determine when a plurality of arrays of data (to be output from the graphics processor to the memory system) together have a data size that is equal to the particular data size. This helps the graphics processor to determine that a sequence of arrays to be output may be able to provide a compression block, such that it can then (e.g. keep track of and) output the arrays of the plurality of arrays appropriately, in the technology described herein.

The graphics processor may determine that a plurality of arrays to be output from the graphics processor to the memory are able to be combined to provide a compression block (for encoding by the data processor) in any suitable and desired way. In an embodiment the (e.g. write out unit of the) graphics processor is configured to (and the method comprises the (e.g. write out unit of the) graphics processor) determine from (e.g. instruction(s) received about) the data size that has been set (e.g. by an application that is using, or by a driver for, the graphics processing system) for (e.g. each array of) a plurality of arrays of data to be processed by the graphics processor, that the plurality of arrays of data together have a data size that is equal to the particular data size. This may be performed, for example, in a similar manner to that outlined above for an individual array.

In one embodiment, the (e.g. write out unit of the) graphics processor is configured to determine when a plurality of arrays to be output by the graphics processor are contiguous arrays in a frame of data being processed. This may help to indicate that the plurality of arrays are able to provide a compression block.

A plurality of arrays that are able to provide a compression block may be output as a sequence of consecutive arrays by (e.g. a processing core of) the graphics processor. However, there may be some instances in which the arrays of the plurality of arrays are not be written out consecutively. For example, there may be a number (e.g. up to 1000s) of processing cycles between arrays of the plurality of arrays, such that they may not be processed and written out in sequence, e.g. the graphics processor may process and write out other array(s) in between. When this happens, the determination (e.g. identification) of the plurality of arrays that are to provide a compression block may (and in an embodiment is) used to keep track of the arrays of the plurality of arrays that are to be combined together to provide the compression block.

For an (and each) array of a plurality of arrays to be output (and, e.g., that have been determined to be able to be combined to provide a compression block), the graphics processor may determine whether to output the array directly to the data encoder (bypassing the cache) or write the array to the cache, in any suitable and desired way. In an embodiment the (e.g. write out unit of the) graphics processor is configured to, following this determination, to output the array of data accordingly to the data encoder directly or to the cache.

In an embodiment the (e.g. write out unit of the) graphics processor is configured to (and the method comprises), for a plurality of arrays to be output (and, e.g., that have been determined to be able to be combined) to provide a compression block, determine when an array of the plurality of arrays is the final array of the plurality of arrays to be output by the graphics processor; and when the array is the final array, output the array to the data encoder, bypassing the cache. In an embodiment, graphics processor is configured to, when the array is other than (i.e. not) the final array, write the array to the cache.

An array of the plurality of arrays may be determined to be the final array (or not) of the plurality of arrays in any suitable and desired way. In an embodiment the (e.g. write out unit of the) graphics processor is configured to (and the method comprises) track the arrays of the plurality of arrays as the arrays are generated by (e.g. written into the (e.g. tile) buffer of) the graphics processor. This helps the graphics processor to identify the final array of the plurality of arrays, such that it may be output to the data encoder directly and the other array(s) of the plurality of arrays retrieved from the cache.

The arrays may be tracked by the graphics processor tracking the (e.g. cumulative) data size of the arrays of the plurality of arrays as they are processed (e.g. written out to the buffer), e.g. so that the final array of the plurality of arrays is identified by being the one that makes the plurality of arrays up to the particular data size. However, in an embodiment, the arrays may be tracked by the (e.g. write out unit of the) graphics processor counting the arrays of the plurality of arrays as they are processed (e.g. written out to the buffer). The (e.g. write out unit of the) graphics processor may thus comprise a counter (e.g. a register) configured to count the arrays of the plurality of arrays as they are written out (to the buffer).

The number of arrays in the plurality of arrays that are to provide a compression block may be determined from (or set by) the information provided by the application that is using, or by a driver for, the graphics processing system. For example, the number of arrays in the plurality of arrays may be determined from the data size of the arrays that are to be processed by the graphics processor and the particular data size that is being used by the data encoder.

When the graphics processor comprises a plurality of processing (e.g. shader) cores, in an embodiment the plurality of arrays that are processed, and are to provide a compression block, are processed, e.g. in sequence, by the same processing core of the graphics processor. Thus in an embodiment a (e.g. each) processing core is configured to keep track of the arrays it is processing to determine when an array of a plurality of arrays (that are to provide a compression block) is to be output to the data encoder directly and, in an embodiment, when an array of the plurality of arrays is to be written to the cache.

Keeping track of the (e.g. final array of the) plurality of arrays as they are written out may be new and advantageous in its own right. Thus, another embodiment of the technology described herein comprises a graphics processing system comprising:

a memory system;
a graphics processor; and
a cache system comprising:
a cache configured to store data for use by the graphics processor when performing graphics processing operations; and
a data encoder associated with the cache and configured to encode blocks of uncompressed data for storing in the memory system in a compressed format;

wherein the graphics processor is configured to, for a plurality of arrays to be output from the graphics processor to the memory system and that together are able to provide a block of uncompressed data for encoding by the data encoder:

determine whether an array of the plurality of arrays data to be output from the graphics processor to the memory system is the final array of the plurality of arrays to be output from the graphics processor; and when the array of data is other than the final array of the plurality of arrays to be output from the graphics processor:
write the array of data from the graphics processor to the cache; and when the array of data is the final array of the plurality of arrays to be output from the graphics processor:
output the final array of data of the plurality of arrays from the graphics processor; and
cause the other array(s) of the plurality of arrays, that have been written to the cache, to be provided from the cache to the data encoder;
whereby the data encoder can encode the plurality of arrays as a block of data for sending to the memory system in a compressed format.

Another embodiment of the technology described herein comprises a method of operating a graphics processing system, the graphics processing system comprising:
a memory system;
a graphics processor; and
a cache system comprising a cache configured to store data for use by the graphics processor when performing graphics processing operations, and a data encoder associated with the cache and configured to encode blocks of uncompressed data for storing in the memory system in a compressed format;

the method comprising, for a plurality of arrays to be output from the graphics processor to the memory system and that together are able to provide a block of uncompressed data for encoding by the data encoder:

the graphics processor determining whether an array of the plurality of arrays data to be output from the graphics processor to the memory system is the final array of the plurality of arrays to be output from the graphics processor; and when the array of data is other than the final array of the plurality of arrays to be output from the graphics processor:
the graphics processor writing the array of data from the graphics processor to the cache; and when the array of data is the final array of the plurality of arrays to be output from the graphics processor:
the graphics processor outputting the final array of data of the plurality of arrays from the graphics processor;
the other array(s) of the plurality of arrays, that have been written to the cache, being provided from the cache to the data encoder; and
the data encoder encoding the plurality of arrays as a block of data for sending to the memory system in a compressed format.

As will be appreciated by those skilled in the art, these embodiments may include any one or more or all of the optional features of the technology described herein. For example, in an embodiment the plurality of arrays to be encoded as a block of data together have a data size equal to the particular data size. In an embodiment the plurality of arrays to be encoded as a block of data are contiguous arrays in a frame of data being processed.

In an embodiment the graphics processor is configured to (and the method comprises) determine when a plurality of arrays of data (to be output from the graphics processor to the memory system) are able to provide the block of uncompressed data for encoding by the data encoder (e.g. owing to them together having the particular data size and/or being contiguous arrays).

In these embodiments, the graphics processor is thus configured to identify when the final array of a plurality of arrays of data that is being generated is to be output, output this array (e.g. to the data encoder) and provide the other array(s) of the plurality of arrays from the cache (where they are stored) to the data encoder. The data encoder is then able to encode the plurality of arrays together as a compression block.

In an embodiment this is achieved by the (e.g. write out unit of the) graphics processor issuing signal(s) to the cache (e.g. via the arbiter) to request (e.g. evict) the other array(s) (or all the arrays) from the cache (and the cache sending the array(s) from the cache to the data encoder in response to this signal). In an embodiment it is also achieved by the (e.g. write out unit of the) graphics processor issuing signal(s) to the encoder (e.g. via the arbiter) for the encoding to encode the plurality of arrays as the compression block (and the encoder encoding the plurality of arrays for sending to memory), In one set of embodiments, the final array of data is output directly to the data encoder, bypassing the cache. In another set of embodiments, the final array (and thus all the arrays) of data is written to the cache, before being provided to the data encoder.

Once the destination to which an array of data is to be output has been determined, in an embodiment the (e.g. write out unit of the) graphics processor is configured to issue a (e.g. side band) signal (e.g. accompanying the array of data) comprising an indication of the destination to which the array of data is to be written.

In an embodiment, the (e.g. write out unit of the) graphics processor is configured to, when (e.g. at least a portion of) an array of data is (e.g. has been determined) to be output to the data encoder directly for encoding, issue a signal (e.g. to the (e.g. arbiter of the) interconnect) indicating that the (e.g. at least a portion of the) array is to be output to the data encoder. In an embodiment the signal indicates that the (e.g. at least a portion of the) array is to be encoded as, or as part of, a compression block.

Similarly, the (e.g. write out unit of the) graphics processor is configured to, when an array of data is to be written to the cache for storing, issue a signal (e.g. to the (e.g. arbiter of the) interconnect) indicating that the array is to be written to the cache. In an embodiment the signal indicates that the (e.g. at least a portion of the) array is to be stored in the cache for encoding later as part of a compression block.

When the system comprises an (e.g. arbiter of an) interconnect, in an embodiment the (e.g. arbiter of the) interconnect is configured to use the signal (e.g. comprising the indication of the destination of an (e.g. at least a portion of an) array) from the (e.g. write out unit of the) graphics processor to direct the (e.g. at least the portion of the) array being output from the graphics processor to the data encoder or the cache, as appropriate (i.e. as per the indication of the destination in the signal).

In an embodiment the (e.g. write out unit of the) graphics processor is configured to, when (e.g. the final array of) a plurality of arrays (that together are to provide a compression block) are output from the graphics processor, issue a signal that causes the array(s) of the plurality of arrays that are stored in the cache to be sent to the data encoder.

The signal may be issued to the cache, e.g. via the (e.g. arbiter of the) interconnect. The cache may be configured, upon receipt of the signal, to send the array(s) of the plurality of arrays that are stored in the cache to the data encoder.

In one embodiment the signal is issued to the data encoder, e.g. via the (e.g. arbiter of the) interconnect. The data encoder is in an embodiment configured, upon receipt of the signal, to request the array(s) of the plurality of arrays that are stored in the cache to the data encoder. In an embodiment the cache is configured, upon receipt of the request, to send the array(s) of the plurality of arrays that are stored in the cache to the data encoder.

The signal that causes the array(s) of the plurality of arrays to be retrieved from the cache may comprise any suitable and desired signal. In an embodiment the signal comprises an indication of the array(s) of the plurality of arrays that are stored in the cache or an indication that the array(s) of the plurality of arrays are to be sent to the data encoder.

For example, the signal may comprise an indication of the identity of the (e.g. individual arrays of the) plurality of arrays that together are to provide a compression block. The signal may comprise an indication that an array is the final array of a plurality of arrays that together are to provide a compression block. The signal may comprise an indication of the ordered position of an (e.g. each) array of a plurality of arrays that together are to provide a compression block.

In this latter case, in an embodiment the writing of the final array to the cache triggers the cache providing all of the plurality of arrays from the cache to the data encoder, e.g. in the same or similar manner to how the other array(s) of the plurality of arrays are triggered to be provided from the cache when the final array is written directly to the data encoder. Thus, in one embodiment, the graphics processor is configured to signal for the cache to provide (e.g. evict) the plurality of arrays (e.g. other than the final array) from the cache to the data encoder.

The (e.g. arbiter of the) interconnect may request the array(s) of the plurality of arrays to be sent from the cache to the data encoder in any suitable and desired way, in response to receiving a signal from the graphics processor indicating that the array(s) of the plurality of arrays, which are stored in the cache, are to be retrieved from the cache, e.g. depending on the nature of the signal. For example, the (e.g. arbiter of the) interconnect may be configured to identify the final array of the plurality of the arrays (using the signal). In an embodiment, the (e.g. arbiter of the) interconnect is configured to, when it has identified the final array of the plurality of the arrays, to signal to the cache (e.g. via the data encoder) to send the array(s) of the plurality of arrays to the data encoder.

The data may be retrieved from the cache in any suitable and desired way. When an array of data to be output is able to be combined with array(s) in the cache to provide a compression block, and thus (in some embodiments) is output to the data encoder, in an embodiment the one or more other arrays already written to (and thus stored in) the cache are provided (and, e.g., evicted) from the cache to the data encoder. Thus in an embodiment these array(s) of data are requested from the cache, e.g. by a signal, and provided from the cache to the data encoder in response to the request.

When the final array is written to the cache, in an embodiment all the arrays of the plurality of arrays of data that are to provide a compression block are (e.g. requested and) provided from the cache. In an embodiment the writing of the final array to the cache triggers the output (e.g. eviction) of the plurality of arrays from the cache.

As outlined above, any suitable and desired component of the system may request the array(s) of data for forming the compression block, when the final array of data is output. Thus, for example, the (e.g. write out unit of the) graphics processor may request the array(s) of data when outputting the final array of data, the (e.g. arbiter of the) interconnect may request the array(s) of data when directing the final array of data to the data encoder or the cache, or the data encoder may request the array(s) of data upon receipt of the final array of data.

The request may be for all the arrays of the plurality of arrays of data (including the final array) that are to provide the compression block, e.g. when the final array is first written to the cache. Alternatively, the request may be for the other array(s) of the plurality of arrays of data that with the final array are to provide the compression block, e.g. when the final array is output directly to the data encoder.

In an embodiment the graphics processor, the (e.g. arbiter of the) interconnect or the data encoder requesting the (e.g. other) array(s) of data for the compression block sends a write request, as appropriate, to the cache where the (e.g. other) array(s) of data are stored. Such a write request, e.g. from the interconnect or the data encoder, may be triggered by a (e.g. side band) signal (e.g. comprising a flag) from the (e.g. write out unit of the) graphics processor that accompanies the final array of the plurality of arrays of data being output.

The request for the array(s) of data of a plurality of arrays may be made at any suitable and desired time. In an embodiment the (e.g. write out unit of the) graphics processor is configured to, when the final array (of a plurality of arrays of data that are to provide a compression block) is being processed, or is to be output, by the graphics processor, issue a signal indicating that the other array(s) of data of the plurality of arrays that are stored in the cache are to be requested to be output from the cache to the data encoder. This helps to reduce the time the data encoder may have to wait for the other array(s) of data from the cache, e.g. before the data encoder is able to encode the plurality of arrays as the compression block.

The (e.g. at least a portion of the) array of data to be output (e.g. written out), to the data encoder or, e.g., the cache, as appropriate, may be output by the (e.g. write out unit of the) graphics processor in any suitable and desired way, e.g. upon the array of data being fully written into the buffer of the graphics processor and its output destination having been determined.

When an at least a portion of an array is to be output to the data encoder, all of the data of the at least a portion of the array may be written to the data encoder (in one operation, as a packet of data). However, in one embodiment, the at least a portion of the array is "streamed" to the data encoder, e.g. such that the data of the at least a portion of the array is being consumed (e.g. encoded) as the data is being written out.

Thus, for example, when an array of data to be output has a data size greater than the particular data size, the whole of the array of data may be streamed to the data encoder, such that the data encoder is then able to encode portions of the array as respective compression blocks, as it receives them. This helps to streamline the process of outputting and encoding the data.

As will be appreciated from the above, embodiments of the technology described herein are implemented in a system comprising a memory system, a cache system, and a graphics processor (a graphics processing unit (GPU)). Data for performing graphics processing operations (e.g. to generate a render output (e.g. image to be displayed)) is in an embodiment stored in a memory of the memory system. The graphics processor is in an embodiment arranged to trigger the fetching of required data from the memory and its storing in the cache system.

The graphics processor then in an embodiment reads required data from the cache system for performing graphics processing operations (e.g. generating the render output). The output from the graphics processing operations (e.g. the render output), once generated in this way, is then written back to the memory system, and, in an embodiment, displayed, e.g. on a display of an electronic device, such as a phone, tablet, television, computer screen or the like.

The graphics processor (graphics processing unit) may, and in an embodiment does, implement and execute a graphics processing pipeline to perform graphics processing operations.

The graphics processing pipeline may, and in an embodiment does, include any one or more, and in an embodiment all, of the processing stages that a graphics processing pipeline may normally include, such as, and in an embodiment, a primitive setup stage, a rasteriser, a renderer (in an embodiment in the form of or including a programmable fragment shader (a shader core)).

In an embodiment, the graphics processor (processing pipeline) also comprises one or more programmable shading stages, such as one or more, and in an embodiment all, of a vertex shading stage, a hull shader, a tessellation stage (e.g. where tessellation is performed by executing a shader program), a domain (evaluation) shading stage (shader), a geometry shading stage (shader), and a fragment shader.

The graphics processor (processing pipeline) may also contain any other suitable and desired processing stages that a graphics processing pipeline may contain such as a depth (or depth and stencil) tester(s), a blender, a tile buffer or buffers, a write out unit, etc.

In an embodiment, the graphics processing system includes a host processor that executes applications that may require graphics processing by the graphics processor. In an embodiment the system further includes appropriate storage (e.g. memory), caches, etc., as described above.

The technology described herein may be used in and with any suitable and desired graphics processing system and processor.

As one example, the technology described herein may be used with tiled renderers (tile-based graphics processing systems). Thus, in an embodiment, the graphics processor (processing pipeline) is a tiled-based graphics processor (processing pipeline). However, other arrangements would of course be possible.

Although the technology described herein has been discussed above with particular reference to cache and encoding operations in relation to a graphics processor in a graphics processing system, the Applicants have recognised that the use of a data encoder associated with a cache in the manner discussed above would be useful in other cache arrangements and systems, and not just in the context of graphics processors.

It is accordingly believed that the operation and system in the manner of the technology described herein when used in data processing systems more generally may be new and advantageous in its own right.

Thus, another embodiment of the technology described herein comprises a data processing system comprising:
 a memory system;
 a processor; and
 a cache system comprising:
  a cache configured to store data for use by the processor when performing data processing operations; and
  a data encoder associated with the cache and configured to:
   encode a block of uncompressed data having a particular data size for storing in the memory system in a compressed format;
 wherein the processor is configured to, for an array of data to be output from the processor to the memory system:
  when the array of data or a portion of the array of data has a data size that is equal to the particular data size, or the array of data is able to be combined with one or more other arrays of data already written to the cache to provide a plurality of arrays of data that together have a data size that is equal to the particular data size:
   provide a portion of the array of data that is equal to the particular data size or the array of data from the processor to the data encoder, bypassing the cache, for encoding as or as part of a block of data having the particular data size.

Another embodiment of the technology described herein comprises a method of operating a data processing system, the data processing system comprising:
 a memory system;
 a processor; and
 a cache system comprising a cache configured to store data for use by the processor when performing data processing operations, and a data encoder associated with the cache and configured to encode a block of uncompressed data having a particular data size for storing in the memory system in a compressed format;

the method comprising:

for an array of data to be output from the processor to the memory system, when the array of data or a portion of the array of data has a data size that is equal to the particular data size, or the array of data is able to be combined with one or more other arrays of data already written to the cache to provide a plurality of arrays of data that together have a data size that is equal to the particular data size:

the processor providing the a portion of the array of data that is equal to the particular data size or the array of data from the processor to the data encoder, bypassing the cache, for encoding as or as part of a block of data having the particular data size.

Another embodiment of the technology described herein comprises a data processing system comprising:

a memory system;

a processor; and a cache system comprising:

a cache configured to store data for use by the processor when performing data processing operations; and a data encoder associated with the cache and configured to encode blocks of uncompressed data for storing in the memory system in a compressed format;

wherein the processor is configured to, for a plurality of arrays to be output from the processor to the memory system and that together are able to provide a block of uncompressed data for encoding by the data encoder:

determine whether an array of the plurality of arrays data to be output from the processor to the memory system is the final array of the plurality of arrays to be output from the processor; and when the array of data is other than the final array of the plurality of arrays to be output from the processor:

write the array of data from the processor to the cache; and when the array of data is the final array of the plurality of arrays to be output from the processor:

output the final array of data of the plurality of arrays from the processor; and cause the other array(s) of the plurality of arrays, that have been written to the cache, to be provided from the cache to the data encoder;

whereby the data encoder can encode the plurality of arrays as a block of data for sending to the memory system in a compressed format.

Another embodiment of the technology described herein comprises a method of operating a data processing system, the data processing system comprising:

a memory system;

a processor; and a cache system comprising a cache configured to store data for use by the processor when performing data processing operations, and a data encoder associated with the cache and configured to encode blocks of uncompressed data for storing in the memory system in a compressed format;

the method comprising, for a plurality of arrays to be output from the processor to the memory system and that together are able to provide a block of uncompressed data for encoding by the data encoder:

the processor determining whether an array of the plurality of arrays data to be output from the processor to the memory system is the final array of the plurality of arrays to be output from the processor; and when the array of data is other than the final array of the plurality of arrays to be output from the processor:

the processor writing the array of data from the processor to the cache; and when the array of data is the final array of the plurality of arrays to be output from the processor:

the processor outputting the final array of data of the plurality of arrays from the processor;

the other array(s) of the plurality of arrays, that have been written to the cache, being provided from the cache to the data encoder; and the data encoder encoding the plurality of arrays as a block of data for sending to the memory system in a compressed format.

As will be appreciated by those skilled in the art, these embodiments may include any one or more or all of the features of the technology described herein.

In an embodiment, the various functions of the technology described herein are carried out on a single processing platform.

In an embodiment, the data or graphics processing system and/or (e.g. graphics) processor also comprises, and/or is in communication with, one or more memories and/or memory devices that store the data described herein, and/or that store software for performing the processes described herein. The data or graphics processing system and/or (e.g. graphics) processor may also be in communication with a host microprocessor, and/or with a display for displaying images based on the data generated by the (e.g. graphics) processor (processing pipeline).

The technology described herein may be implemented in any suitable system, such as a suitably configured microprocessor based system. In some embodiments, the technology described herein is implemented in computer and/or micro-processor based system.

The various functions of the technology described herein may be carried out in any desired and suitable manner. For example, the functions of the technology described herein may be implemented in hardware or software, as desired. Thus, for example, the various functional elements and stages of the technology described herein may comprise a suitable processor or processors, controller or controllers, functional units, circuits/circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., when desired.

Furthermore, any one or more or all of the processing stages of the technology described herein may be embodied as processing stage circuits/circuitry, e.g., in the form of one or more fixed-function units (hardware) (processing circuits/circuitry), and/or in the form of programmable processing circuits/circuitry that may be programmed to perform the desired operation. Equally, any one or more of the processing stages and processing stage circuits/circuitry of the technology described herein may be provided as a separate circuit element to any one or more of the other processing stages or processing stage circuits/circuitry, and/or any one or more or all of the processing stages and processing stage circuits/circuitry may be at least partially formed of shared processing circuits/circuitry.

It will also be appreciated by those skilled in the art that all of the described embodiments of the technology described herein can include, as appropriate, any one or more or all of the features described herein.

The methods in accordance with the technology described herein may be implemented at least partially using software, e.g. computer programs. It will thus be seen that in further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said graphics processor, renderer or system to carry out the steps of the methods of the technology described herein. Such a computer software carrier could be a physical storage medium such as a ROM chip, CD ROM, RAM, flash memory, or disk.

It will further be appreciated that not all steps of the methods of the technology described herein need be carried out by computer software and thus from a further embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable storage medium, for example, diskette, CD ROM, ROM, RAM, flash memory, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

Like reference numerals are used for like elements and features in the Figures, where appropriate.

A number of embodiments of the technology described herein will now be described in the context of a graphics processing system.

FIG. 1 shows an exemplary graphics processing system 1 in which the technology described herein and the present embodiments may be implemented.

The exemplary graphics processing system 1 shown in FIG. 1 comprises a host processor comprising a central processing unit (CPU) 2, a graphics processor (graphics processing unit (GPU)) 3, a video codec 4, a display controller 5 and a memory controller 6, which are in the form of a system on chip (SoC) 7. As shown in FIG. 1, these units communicate via an interconnect 8 and have access to an off-chip memory system (memory) 9. In this system, the GPU 3, the video codec 4 and/or CPU 2 will generate frames (images) to be displayed and the display controller 5 will then provide frames to a display 10 for display.

In use of this system, an application 11, such as a game, executing on the host processor (CPU) 2 will, for example, require the display of frames on the display 10. To do this the application 11 will send appropriate commands and data to a driver 12 for the graphics processing unit 3 that is executing on the CPU 2. The driver 12 will then generate appropriate commands and data to cause the graphics processing unit 3 to render appropriate frames for display and store those frames in appropriate frame buffers, e.g. in main memory 9. The display controller 5 will then read those frames into a buffer for the display from where they are then read out and displayed on the display panel of the display 10.

As part of this processing, the graphics processor 3 will read in data, such as textures, geometry to be rendered, etc. from the memory 9, process that data, and then return data to the memory 9 (e.g. in the form of processed textures and/or frames to be displayed), which data will then further, e.g. as discussed above, be read from the memory, e.g. by the display controller 5, for display on the display 10. Thus there will need to be transfer of data to and from the graphics processor 3 (in particular to and from the processing cores of the graphics processor 3) and the memory 9.

In order to facilitate this and to reduce the amount of data that is output to the memory 9 during graphics processing operations, the graphics processing system 1 also comprises a cache system 13, arranged between the interconnect 8 and the memory 9. The cache system 13 is operable to transfer data between the memory 9 and the graphics processor 3. The cache system 13 thus helps to control the sending of data (e.g. pixel) blocks generated by the graphics processor 3 to the memory 9.

Figure 2:
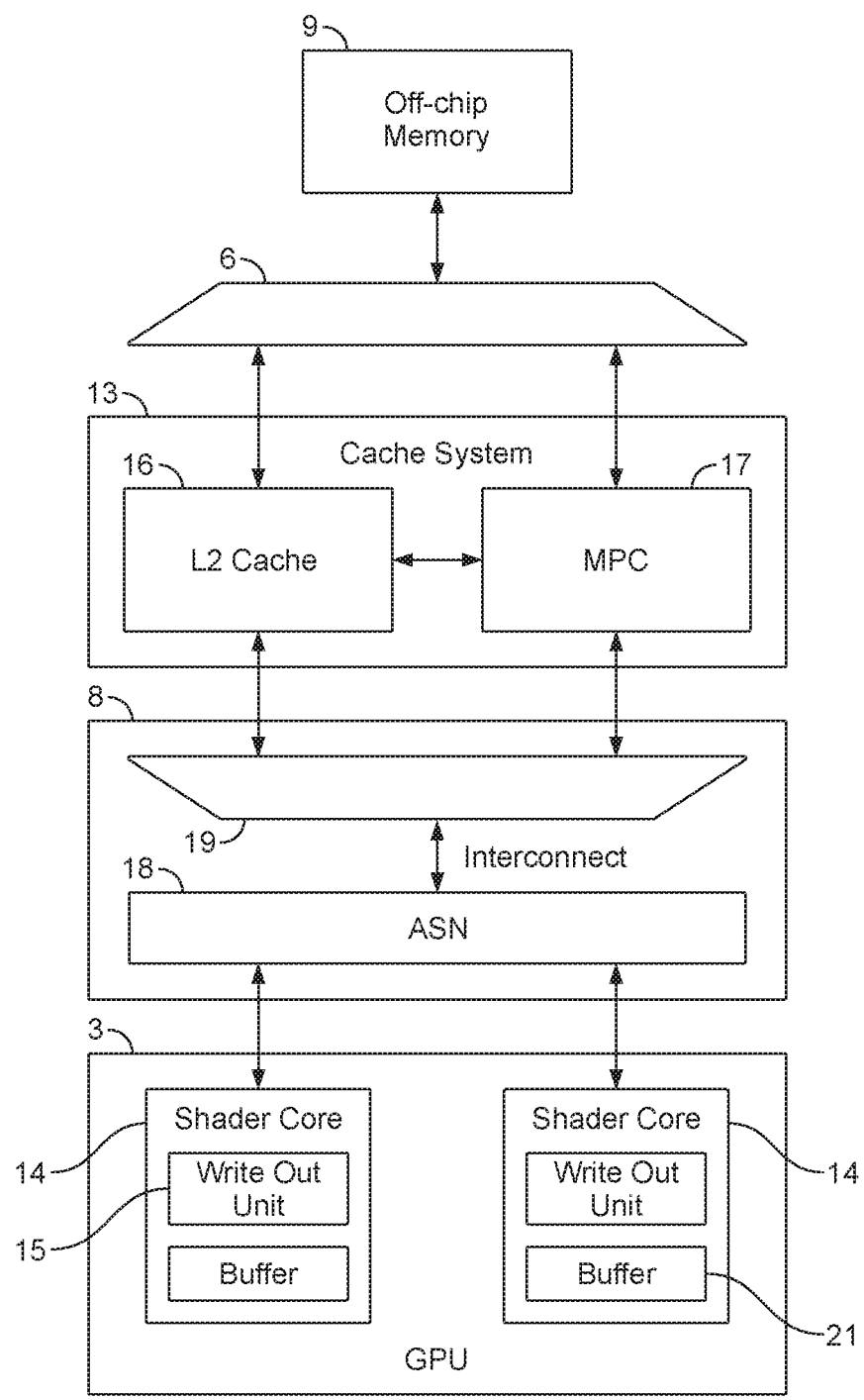
FIG. 2 shows an embodiment of the cache system of the graphics processing system of FIG. 1 in more detail.

FIG. 2 shows schematically and in more detail the elements of the graphics processing system 1 (including components of the cache system 13) that are relevant to the operation of the present embodiments, and in particular to the transferring of data to the memory 9 from the graphics processor 3. As will be appreciated by those skilled in the art, there may be other elements of the system, etc., that are not shown in FIG. 2.

FIG. 2 shows the memory 9 and the graphics processor 3. The graphics processor includes multiple processing (shader) cores 14. Each shader core 14 includes a write out unit 15 and a buffer 21. The buffer 21 stores data processed by, and which is to be output from, its shader core 14. The write out unit 15 controls the output of data from the buffer 21 of its shader core 14.

As shown in FIG. 2, in between the memory 9 and the processing (shader) cores 14 of the graphics processor 3, there is a cache system 13 that is operable to transfer data from the memory 9 to the graphics processor 3 (and in particular to the processing cores (shader cores) 14 of the graphics processor 3), and conversely to transfer data produced by the processing cores 14 of the graphics processor 3 back to the memory 9.

The cache system shown in FIG. 2, is illustrated as including an L2 cache 16 from which data is provided to the shader cores 14. Other cache hierarchy arrangements would be possible, such as comprising multiple cache levels, when desired. As shown in FIG. 2, in this embodiment data is transferred from the memory 9 to the L2 cache 16, and from the L2 cache 16 to the shader cores 14 (and vice-versa).

In order to facilitate the handling of compressed data from the memory 9 (and for returning compressed data to the memory 9) via the memory controller 6 when that is required, as shown in FIG. 2, the L2 cache 16 has associated with it a data encoder 17 (in the form of a memory page compression unit (MPC)).

This data encoder 17 is operable to decompress data received from the memory 9 before storing that data in an uncompressed form in the L2 cache 16 for use by the shader cores 14 of the graphics processor 3, and, conversely, to compress data (either that is to be evicted from the L2 cache 16 or that is received directly from the shader cores 14) prior to sending that data back to the memory 9. The operation of this data encoder (MPC) 17 will be discussed in more detail below.

Figure 3:
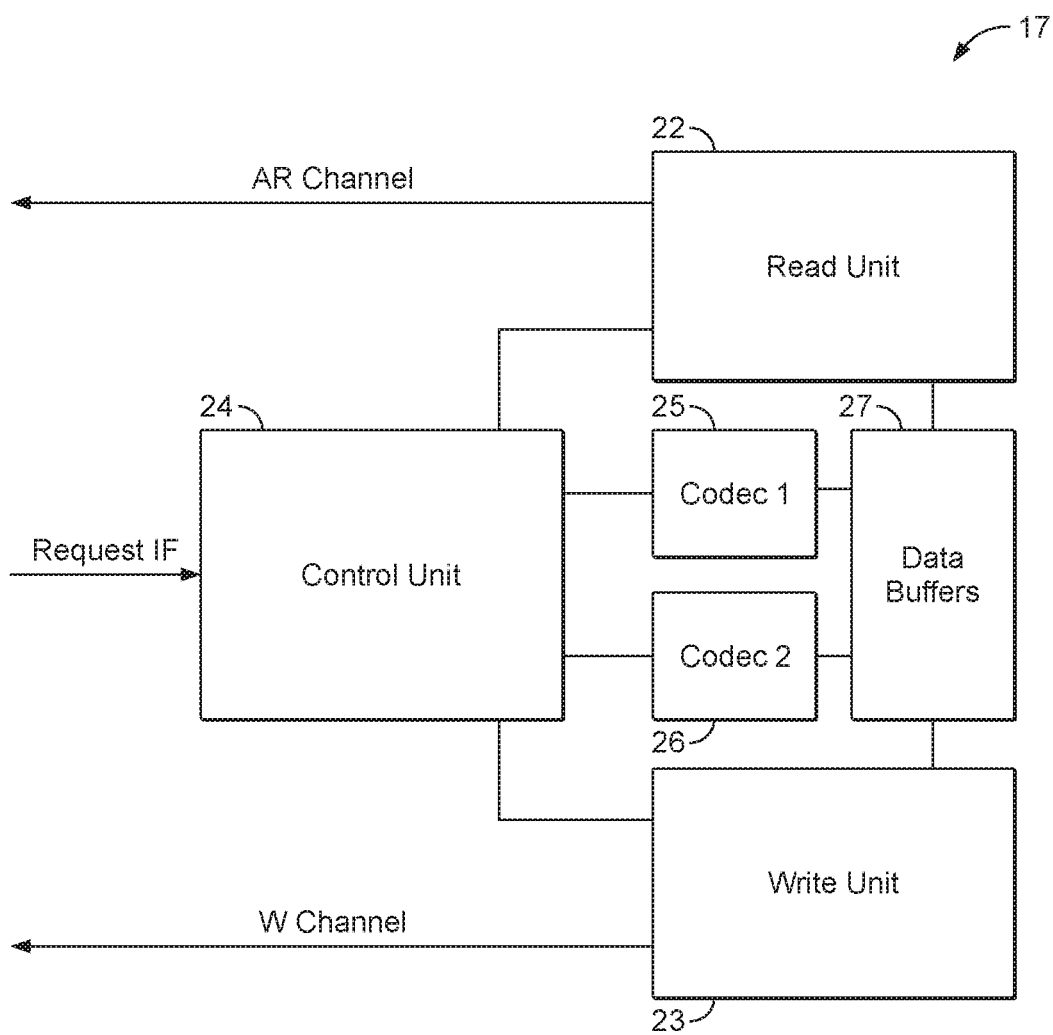
FIG. 3 shows an embodiment of the data encoder in more detail.

FIG. 3 shows an embodiment of the data encoder (memory page compression unit) 17 in the present embodiments. As shown in FIG. 3, the (and each) data encoder 17 includes respective read 22 and write 23 units (circuits) that are operable to, respectively, read data from the L2 cache and the memory system, and write data to the L2 cache and to the memory system. The data encoder 17 also includes an appropriate control unit (circuit) 24 that receives read and write requests from the shader cores and the L2 cache controller and controls the data encoder 17 to respond to those requests accordingly and appropriately.

As shown in FIG. 3, the data encoder 17 also includes one or more codecs 25, 26 and a set of data buffers 27 for temporarily storing data in the data encoder 17 while that data is processed and/or while waiting to write that data to the L2 cache or the memory system.

The data encoder 17 can include any desired number of codecs, e.g. that are each respectively operable to perform a different encoding (compression) scheme. For example, one codec may be configured to perform an appropriate variable rate compression scheme, with the other codec being configured to perform an alternative, e.g. fixed rate compression scheme.

Other arrangements would, of course, be possible.

The graphics processing system 1 also includes, as shown in FIG. 2, an appropriate interconnect 8 for transferring data between the L2 cache 16 and/or the data encoder 17, and the shader cores 14. The interconnect 8 comprises, in this embodiment, an asynchronous switch network (ASN) 18 and an arbiter 19. The arbiter 19 is configured to determine whether data from the shader cores 14 is to be directed to the L2 cache 16 or the data encoder 17.

In the present embodiments, the data (e.g. data arrays of frames of data) that are being processed by the graphics processor 3 are stored as respective blocks of data (blocks of the frames of data) in the memory 9, with each data block being stored in the memory 9 in a compressed form, but being stored in the L2 cache 16 for the graphics processor 3 in an uncompressed form for use by the shader cores 14 of the graphics processor 3.

In an embodiment, the "compression blocks" of data that are stored in the memory 9 in a compressed form comprise 256 bytes of data. This size of data blocks may, for example, correspond to an integer number of (e.g. four) cache lines. Other sizes of the compression blocks and capacities of the cache lines are, of course, possible, e.g. depending on the relative cache line sizes used in the graphics processing system in question.

Figure 4:
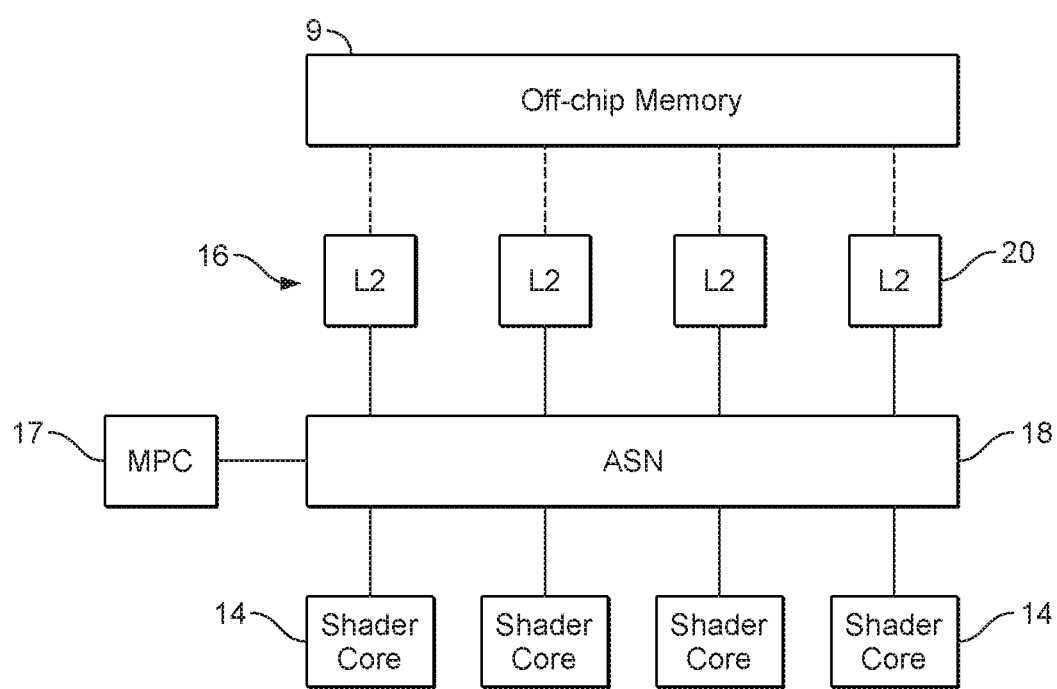
FIG. 4 shows another embodiment of the cache system of the graphics processing system of FIG. 1 in more detail.

FIG. 4 shows the arrangement of the L2 cache 16, the data encoder (memory page compression unit) 17 and the shader cores 24 in a possible implementation of the present embodiments.

The L2 cache 16 is shown as being configured as respective separate physical cache portions (slices) 20. In the arrangement shown in FIG. 4, there is a single data encoder 17, which operates for all the L2 cache slices 20, and which is coupled to and associated with the interconnect (ASN) 18 that acts between the L2 cache 16 and the shader cores 14 of the graphics processor.

It will be appreciated that other arrangements are possible. For example, in other embodiments, each respective L2 slice may have its own associated data encoder rather than a single data encoder being associated with the whole of the L2 cache.

Figure 5:
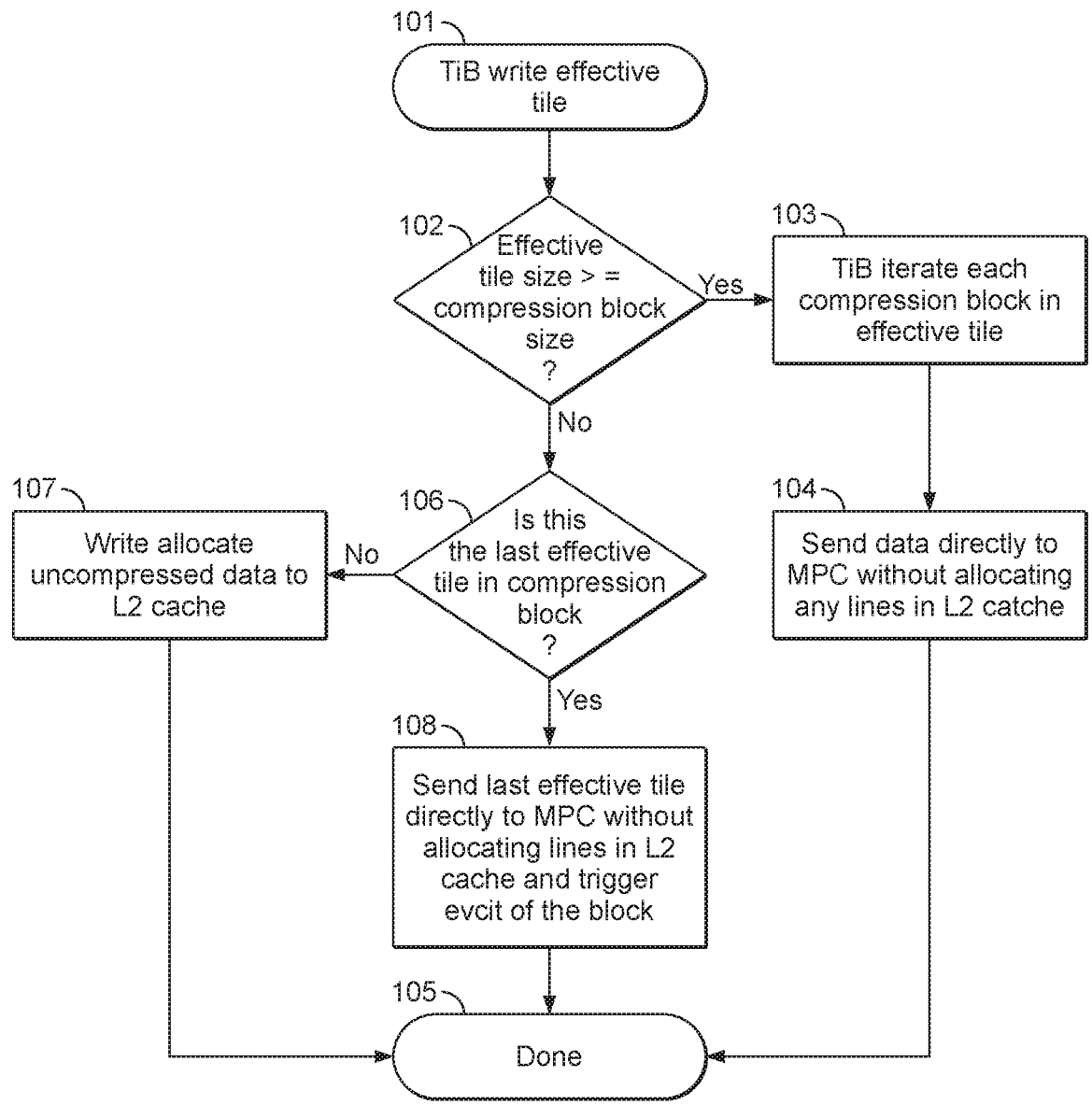
FIG. 5 is a flowchart showing an operation of outputting data from the graphics processor to the memory in an embodiment of the technology described herein.

FIG. 5 shows the operation of embodiments of the technology described herein, with reference to the graphics processing system 1 shown in FIGS. 1 to 4.

First, a shader core 14 of a GPU 3 processes and writes a tile of image data to the tile buffer 21 of the shader core 14, for outputting to the memory 9. The application 11 that is using the GPU 3 or the driver 12 for the GPU 3 will set the size of the tiles that are to be processed by the GPU 3. The write out unit 15 that is associated with the tile buffer 21 then prepares to output the tile to memory 9 (step 101, FIG. 5).

From information provided by the application 11 or the driver 12 about the tile being processed, the write out unit 15 determines the data size of the tile that is to be output. The tile size is compared to the particular data size of a compression block (the block size at which the data encoder (MPC unit) 17 of the cache system encodes (compresses) data for storing in the memory 9 in a compressed format) (step 102, FIG. 5). A compression block may have a data size of 256 B, for example.

When the data size of the tile is greater than or equal to the data size of the compression block, this means that the write out unit 15 of the shader core 14 is able to send (e.g. write, stream) the tile data directly to the data encoder 17 for encoding as compression blocks for sending to memory 9, thus bypassing the cache. The write out unit 15 iterates over regions of the tile that have a data size equal to the compression block (step 103, FIG. 5).

Figure 6:
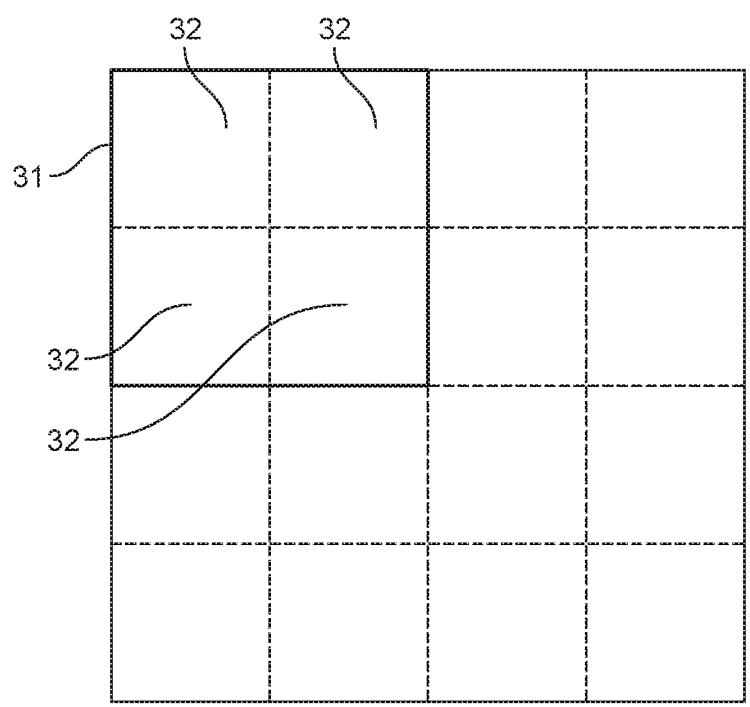
FIGS. 6 and 7 show tiles that are to be output from the graphics processor to the memory in embodiments of the technology described herein.

FIG. 6 shows schematically a tile 31 that is being processed by, and is to be output from, the GPU 3 to the memory 9, in an embodiment of the technology described herein. The tile 31 has a size of 8×8 pixels (comprising four 4×4 sub-tiles 32). Using the 32 bits (4 bytes) per pixel image format RGBA8888, the tile 31 has a data size of 256 B. When the compression block has a data size of 256 B, this size of tile 31 (256 B) is output directly to the data encoder 17 to be encoded as a compression block.

In this simpler case, the tile size is equal to the compression block size and thus the whole of the tile 31 is sent to the data encoder 17 in a single iteration.

When the tile size is greater than the compression block size, the tile is divided into multiple portions equal to the compression block and sent to the data encoder 17 over multiple iterations.

Figure 7:
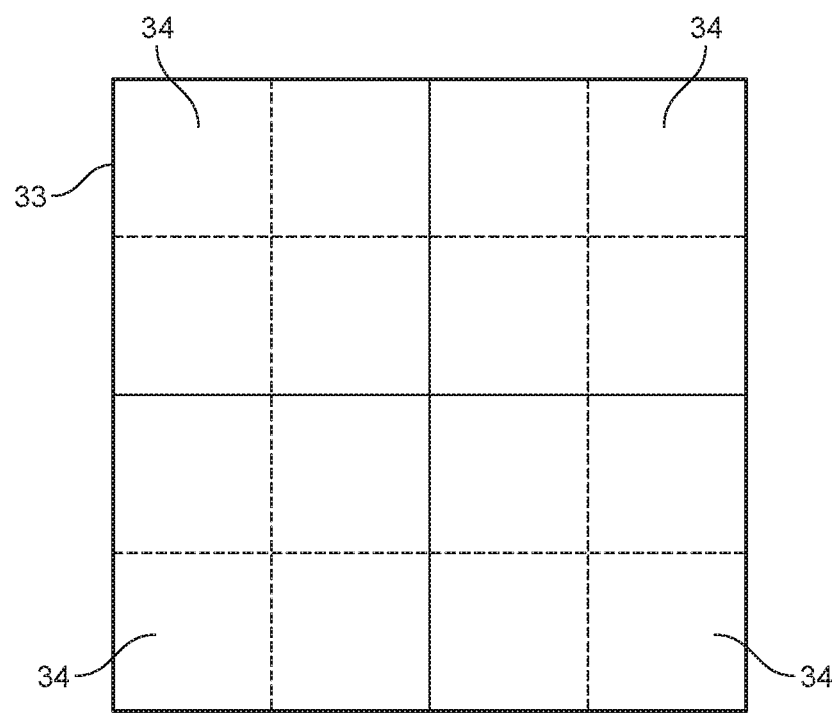

FIG. 7 shows schematically a tile 33 that is being processed by, and is to be output from, the GPU 3 to the memory 9, in an embodiment of the technology described herein. This tile 33 has a size of 16×16 pixels and using the 32 bits (4 bytes) per pixel image format RGBA8888, has a data size of 1024 B. When the compression block has a data size of 256 B, this size of tile (1024 B) can thus be divided into four 8×8 regions 34 of 256 B (equivalent to the tile 31 shown in FIG. 6) each for writing out to be encoded as a compression block.

The regions 34 of the tile 33 are sent to the data encoder 17 directly, for encoding, such that no lines are allocated in the L2 cache 16 for the temporary storage of this data (step 104, FIG. 5). It will be seen that this is an efficient process for outputting the data from the tile buffer 21 and allows the limited resources of the L2 cache 16 to be reserved for data that may be required by the shader cores 14.

Once encoded, the (e.g. each) compression block is sent to the off-chip memory 9. The process is then repeated for each tile processed by each shader core 14 of the GPU 3 (step 105, FIGS. 5).

Figure 8:
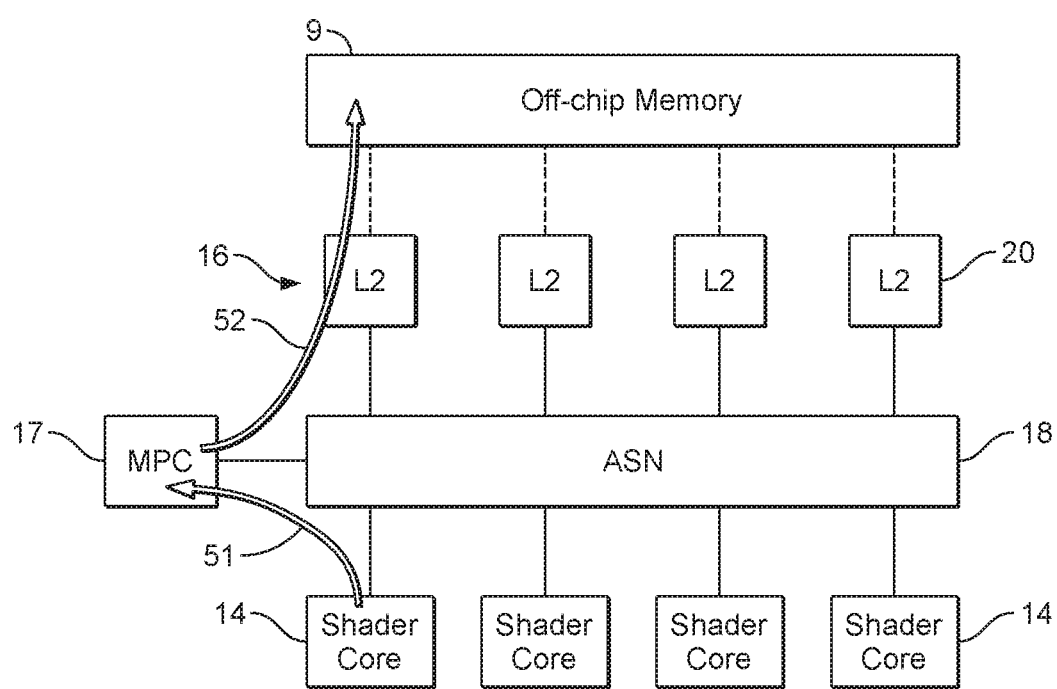
FIG. 8 shows an operation of writing data from the graphics processor to the memory in an embodiment of the technology described herein using the cache system shown in FIG. 4.

FIG. 8 shows this process schematically, using the cache system shown in FIG. 4. When a (e.g. portion of a) tile, having a data size equal to the particular size of a compression block (e.g. as shown in FIG. 6 or 7), is to be output from the tile buffer 21 of a shader core 14 to the memory 9, it is output directly 51 to the data encoder 17, for encoding, instead of being stored temporarily in the L2 cache 16.

The interconnect (ASN) 18 (e.g. including an arbiter 19 as shown in FIG. 2) sees (e.g. from side band information provided by the write out unit 15 of the shader core 14, which accompanies the (e.g. portion of the) tile) that the (e.g. portion of the) tile being written out has a data size equal to the compression block. The (e.g. arbiter 19 of the) interconnect 18 directs the (e.g. portion of the) tile being written out to the data encoder 17 directly.

Once the (e.g. portion of the) tile has been encoded (compressed), the data encoder 17 sends 52 the encoded compression block to the memory 9.

Operation of the graphics processing system 1 will now be described, again with reference to FIGS. 1-4, for tiles being output from a shader core 14 of the GPU 3 that have a data size that is smaller than the data size of the compression block.

Figure 9:
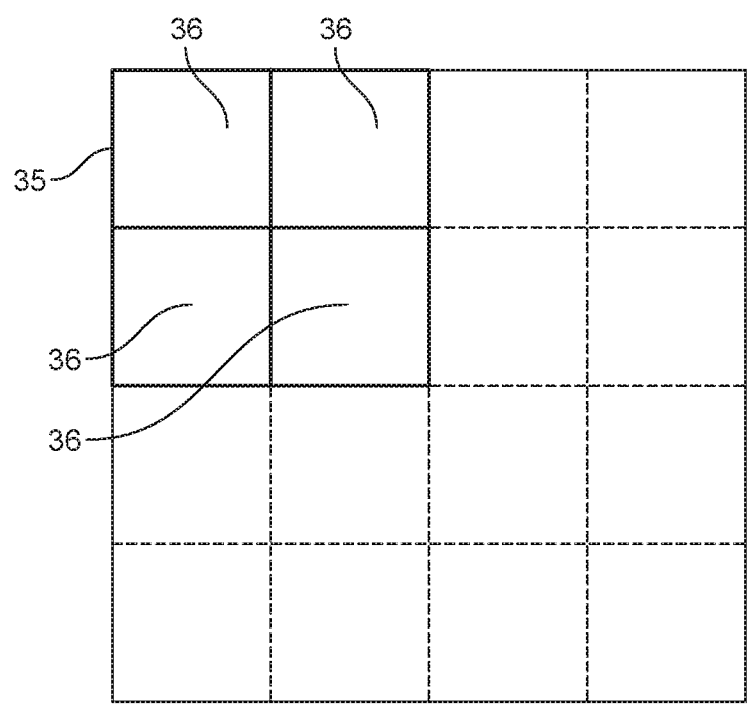
FIG. 9 shows a group of tiles that is to be output from the graphics processor to the memory in an embodiment of the technology described herein.

FIG. 9 shows schematically a group of tiles 35 that is being processed by, and is to be output from, the GPU 3 to the memory 9, in an embodiment of the technology described herein. The tiles 36 of the group of tiles 35, for example, may each have a size of 4×4 pixels and use the 32 bits (4 bytes) per pixel image format RGBA8888, giving a data size of 64 B per tile. For a compression block having a data size of 256 B, four 64 B tiles are able to be combined into, and for encoding as, a compression block. Groups of tiles being processed by a particular shader core 14 of the GPU 3, and thus which are conveniently encoded as a compression block, are typically from contiguous regions of a frame of data, as shown in FIG. 9. Such tiles may be stored in contiguous regions of the memory 9.

A group 35 of such tiles 36 of image data being processed by a shader core 14 of the GPU 3 are written to the tile buffer 21 of the shader core 14, for outputting to the memory 9. The application 11 that is using the GPU 3 or the driver 12 for the GPU 3 will set the size of the tiles 36 and the number of tiles in a group 35 that are to be processed by the GPU 3. The write out unit 15 that is associated with the tile buffer 21 then prepares to output the tiles 36 to the memory 9 (step 101, FIG. 5).

From information provided by the application 11 or the driver 12 about the group of tiles 35 being processed, the write out unit 15 determines the data size of the tiles 36 and the number of tiles in each group 35 that are to be output. The write out unit 15 is thus able to determine, by comparing the tile size to the particular data size and knowing how many tiles are in each group 35, that the group of tiles is able to provide a compression block.

For these tiles 36, having a data size that is less than the data size of the compression block, the write out unit 15 of the shader core 14 determines whether or not a tile 36 is the final tile in a group of tiles 35 that are able to be combined to form a compression block (step 106, FIG. 5)

When the tile 36 being processed is determined not to be the final tile in a group of tiles 35 (step 106, FIG. 5), the tile 36 is allocated and written to a line of the L2 cache 16 (step 107, FIG. 5). The (e.g. arbiter 19 of the) interconnect 18 sees (e.g. from side band information provided by the write out unit 15 of the shader core 14, which accompanies the tile 36) that the tile 36 being written out has a data size less than the compression block. The (e.g. arbiter 19 of the) interconnect 18 directs the tile 36 being written out to the L2 cache 16.

The lines of the L2 cache 16 may, for example, each have a capacity of 64 B. A tile 36 having a data size of 64 B will thus fill such a cache line.

The shader core 14 of the GPU 3 then processes the next tile 36 in the group of tiles 35. When this tile 36 is determined not to be the final tile 36 in the group of tiles 35 (step 106, FIG. 5), the tile 36 is again allocated and written to a (e.g. different) line of the L2 cache 16 (step 107, FIG. 5).

When the final tile 36 in the group of tiles 35 is determined to being processed (step 106, FIG. 5), instead of being allocated and written to a line of the L2 cache 16, the tile 36 is written to the data encoder 17 directly (step 108, FIG. 5).

Upon receipt of this final tile 36 of the group of tiles 35, the data encoder 17 determines that the other tiles 36 of the group of tiles 35 are required to form a compression block. The data encoder 17 requests these tiles 36 from the L2 cache 16. This process is shown in FIG. 10.

Figure 10:
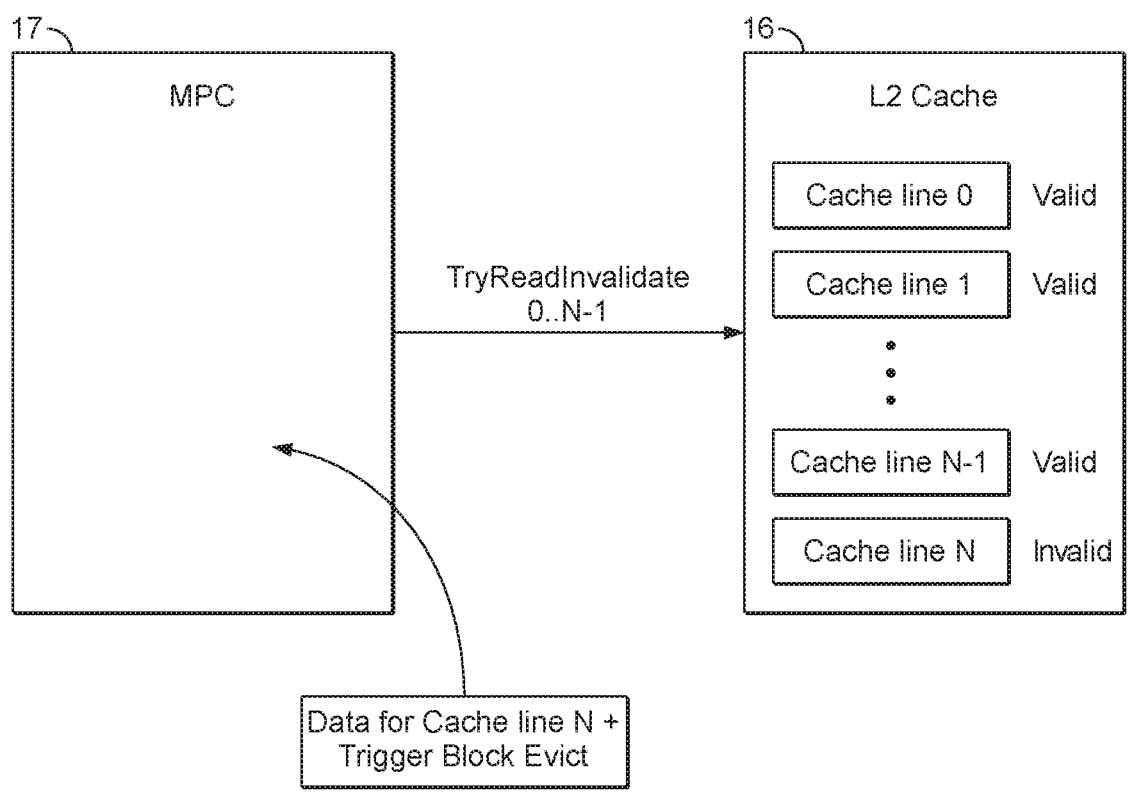
FIG. 10 shows an operation of a data encoder requesting data from a cache in an embodiment of the technology described herein.

FIG. 10 shows the data encoder 17 receiving the final tile of data from the shader core 14. The receipt of this data triggers the data encoder 17 to issue a request for the other tiles in the group of tiles from the L2 cache 16. These tiles are shown as being located in cache lines 0 to N-1 of the L2 cache 16. These cache lines are evicted, with the evicted data for the tiles being sent to the data encoder 17.

Once the data encoder 17 has received the data from the evicted cache lines of the L2 cache 16, the data encoder 17 possesses all the data for a compression block. The data encoder 17 combines and encodes (compresses) all the tiles of the group of tiles as a single compression block.

The encoded compression block is then written out to the off-chip memory 9. The process is then repeated for each tile (or group of tiles) processed by each shader core 14 of the GPU 3 (step 105, FIG. 5).

Figure 11:
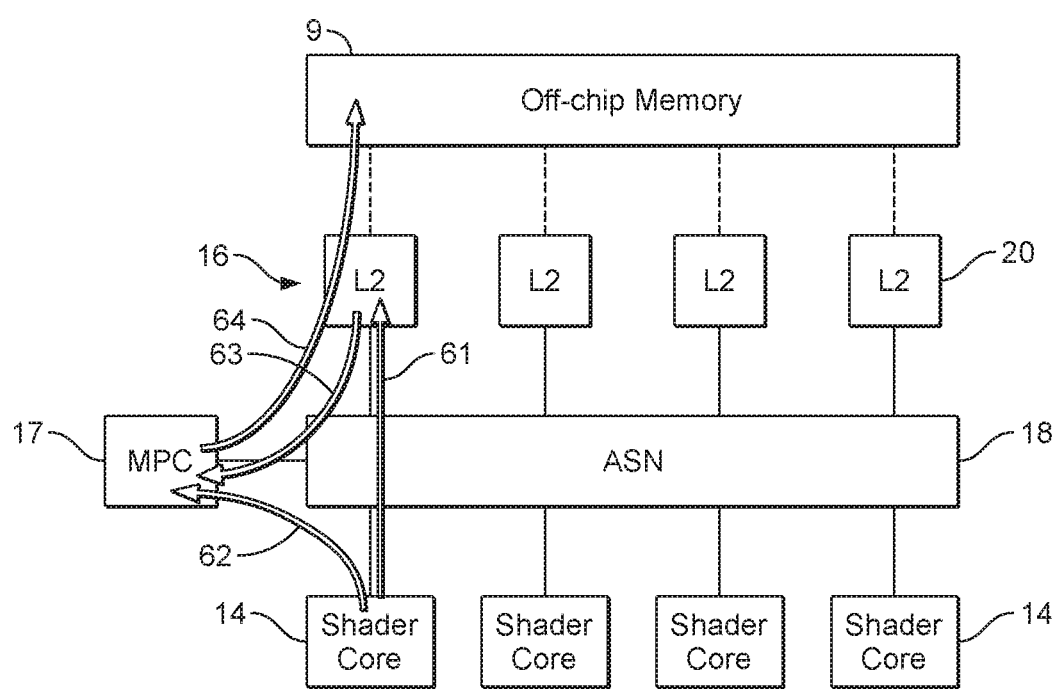
FIG. 11 shows an operation of writing data from the graphics processor to the memory in another embodiment of the technology described herein using the cache system shown in FIG. 4.

FIG. 11 shows this process schematically, using the cache system shown in FIG. 4. First, tile(s) of a group of tiles that are to be output from the tile buffer 21 of a shader core 14 to the memory 9, and which are not the final tile of the group of tiles, are written 61 from the shader core 14 to the (e.g. associated slice 20 of the) L2 cache 16. When the final tile of the group of tiles is to be written out from the tile buffer 21 of the shader core 14 to the memory 9, this tile is output directly 62 to the data encoder 17, instead of being stored temporarily in the L2 cache 16.

The interconnect (ASN) 18 (e.g. including an arbiter 19 as shown in FIG. 2) sees (e.g. from side band information provided by the write out unit 15 of the shader core 14, which accompanies each tile) the ordered position of a tile in a group of tiles, as it is output from the tile buffer 21. The (e.g. arbiter 19 of the) interconnect 18 thus tracks the tiles as they are being output and directs the tile being output to the L2 cache or the data encoder 17 directly, as appropriate.

Receipt of the final tile of the group of tiles, which is tracked by the (e.g. arbiter 19 of the) interconnect 18, triggers the data encoder 17 to request the other tile(s) of the group of tiles from the L2 cache 16. These other tiles are retrieved 63 from the cache to the data encoder 17. The data encoder 17 combines and encodes (compresses) all the tiles of the group of tiles as a single compression block and sends 64 this encoded compression block to the off-chip memory 9.

Figure 12:
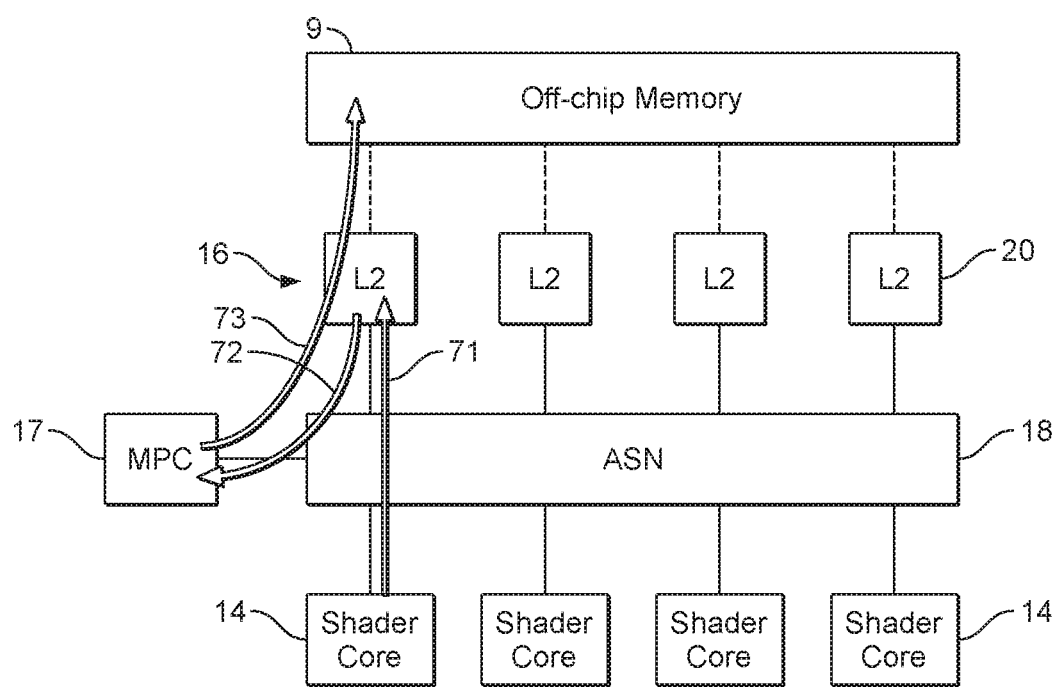
FIG. 12 shows an operation of writing data from the graphics processor to the memory in another embodiment of the technology described herein using the cache system shown in FIG. 4.

FIG. 12 shows an operation of writing data from the graphics processor to the memory in another embodiment of the technology described herein using the cache system shown in FIG. 4. Operation of the embodiment shown in FIG. 12 is a variation of the embodiment shown in FIG. 11.

The difference between operation of the embodiments shown in FIGS. 11 and 12 is that when it comes to outputting the final tile of the group of tiles from the tile buffer 21 of a shader core 14 to the memory 9, the final tile is written 71 to the L2 cache 16, i.e. in the manner of the other tile(s) of the group of tiles written 71 to the L2 cache 16 previously. Thus, in the embodiment shown in FIG. 12, the final tile is first written 71 to the L2 cache 16, rather than being output directly to the data encoder 17 (bypassing the L2 cache 16) as shown in FIGS. 8, 10 and 11.

On writing out 71 of the final tile to the L2 cache 16, the write out unit 15 of the shader core 14 issues a write request (in a side band signal) to the L2 cache 16 that receives the final tile. This request triggers all of the tiles of the group of tiles to be written (e.g. evicted) 72 from the cache to the data encoder 17.

The data encoder 17 then combines and encodes (compresses) all the tiles of the group of tiles as a single compression block and sends 73 this encoded compression block to the off-chip memory 9.

It can be seen from the above that, in at least some embodiments, the technology described herein provides a graphics processing system and a method of operating a graphics processing system in which (e.g. portions of) arrays (e.g. tiles) of data that can be output to a data encoder directly, owing to the (e.g. portions of) arrays being equal to the compression block or being the final array of a group of arrays that are to provide the compression block, are written to the data encoder, bypassing the cache.

This helps to simplify the process of writing out data for encoding, which may make it faster and more efficient. This is because for the (e.g. portion of the) array of data written straight to the encoder, the data does not first need to be written to the cache and then evicted to the encoder, thus saving both time and power. It also avoids line(s) in the cache having to be allocated for the (e.g. portion of the) array of data.

The foregoing detailed description has been presented for the purposes of illustration and description. It is not intended to be exhaustive or to limit the technology described herein to the precise form disclosed. Many modifications and variations are possible in light of the above teaching. The described embodiments were chosen in order to best explain the principles of the technology, and its practical application, to thereby enable others skilled in the art to best utilise the technology, in various embodiments and with various modifications as are suited to the particular use contemplated. It is intended that the scope be defined by the claims appended hereto.

The invention claimed is:

1. A data processing system comprising:
a memory system;
a processor; and
a cache system comprising:
 a cache configured to store data for use by the processor when performing data processing operations; and
 a data encoder associated with the cache and configured to:
  encode a block of uncompressed data having a particular data size for storing in the memory system in a compressed format;
wherein the processor is configured to, for an array of data to be output from the processor to the memory system:
 when the array of data or a portion of the array of data has a data size that is equal to the particular data size, or the array of data is able to be combined with one or more other arrays of data already written to the cache to provide a plurality of arrays of data that together have a data size that is equal to the particular data size:
  provide the portion of the array of data that is equal to the particular data size or the array of data from the processor to the data encoder, bypassing the cache, for encoding as or as part of a block of data having the particular data size; and
wherein the processor is configured to:
 when the array of data to be output has a data size that is greater than the particular data size, output the array of data as a plurality of portions of data of the array of data, each portion of data having a data size equal to the particular data size, and being output to the data encoder, bypassing the cache.

2. The data processing system as claimed in claim 1, wherein the processor is configured to:
determine when the array of data or a portion of the array of data has a data size that is equal to the particular data size, or when the array of data is able to be combined with one or more other arrays of data already written to the cache to provide a plurality of arrays of data that together have a data size that is equal to the particular data size; and
when it has been determined that the array of data or a portion of the array of data to be output from the processor to the memory system is of the particular data size, or that the array is able to be combined with one or more other arrays to provide a block of data of the particular data size, output a portion of the array of data that is equal to the particular data size or the array of data to the data encoder, bypassing the cache.

3. The data processing system as claimed in claim 1, wherein the processor is configured to:
when an array of data is to be output to the data encoder, bypassing the cache, issue a signal indicating that the array is to be output to the data encoder; and
when an array of data is to be written to the cache for storing, issue a signal indicating that the array is to be written to the cache; and
wherein the data processing system comprises an arbiter configured to:
 use the signal from the processor to direct the array being output from the processor to the data encoder or the cache as indicated by the signal.

4. A data processing system comprising:
a memory system;
a processor; and
a cache system comprising:
   a cache configured to store data for use by the processor when performing data processing operations; and
   a data encoder associated with the cache and configured to:
      encode a block of uncompressed data having a particular data size for storing in the memory system in a compressed format
wherein the processor is configured to, for an array of data to be output from the processor to the memory system:
   when the array of data or a portion of the array of data has a data size that is equal to the particular data size, or the array of data is able to be combined with one or more other arrays of data already written to the cache to provide a plurality of arrays of data that together have a data size that is equal to the particular data size:
      provide the portion of the array of data that is equal to the particular data size or the array of data from the processor to the data encoder, bypassing the cache, for encoding as or as part of a block of data having the particular data size;
wherein the processor is configured to:
   when the array of data has a data size that is less than the particular data size and the array is not able to be combined with one or more other arrays of data already written to the cache to provide a plurality of arrays of data having a data size that is equal to the particular data size:
   write the array of data from the processor to the cache.

5. A data processing system comprising:
a memory system;
a processor; and
a cache system comprising:
   a cache configured to store data for use by the processor when performing data processing operations; and
   a data encoder associated with the cache and configured to:
      encode a block of uncompressed data having a particular data size for storing in the memory system in a compressed format
wherein the processor is configured to, for an array of data to be output from the processor to the memory system:
   when the array of data or a portion of the array of data has a data size that is equal to the particular data size, or the array of data is able to be combined with one or more other arrays of data already written to the cache to provide a plurality of arrays of data that together have a data size that is equal to the particular data size:
      provide the portion of the array of data that is equal to the particular data size or the array of data from the processor to the data encoder, bypassing the cache, for encoding as or as part of a block of data having the particular data size;
wherein the processor is configured to:
   for a plurality of arrays to be output from the processor to the memory system that together have the particular data size:
      determine when an array of the plurality of arrays is the final array of the plurality of arrays to be output by the processor;
      when the array is the final array, output the array to the data encoder, bypassing the cache; and
      when the array is other than the final array, write the array to the cache.

6. The data processing system as claimed in claim 5, wherein the processor is configured to, when the final array of the plurality of arrays is to be output from the processor, issue a signal indicating that the other array(s) of data of the plurality of arrays that are stored in the cache are to be requested to be output from the cache to the data encoder.

7. The data processing system as claimed in claim 6, wherein the cache is configured to, in response to the signal, provide the other array(s) of data of the plurality of arrays from the cache to the data encoder.

\* \* \* \* \*